(12) United States Patent
George et al.

(10) Patent No.: US 12,166,814 B2
(45) Date of Patent: Dec. 10, 2024

(54) ACTOR-AND-DATA-GRID-BASED DISTRIBUTED APPLICATIONS

(71) Applicant: VMware LLC, Palo Alto, CA (US)

(72) Inventors: Zacharia George, Bangalore (IN); Ishaan Kohli, Bangalore (IN); Vamshik Shetty, Bangalore (IN); Vishnu Vardhan Malepati, Bangalore (IN)

(73) Assignee: VMware LLC, Palo Alto, CA (US)

( * ) Notice: Subject to any disclaimer, the term of this patent is extended or adjusted under 35 U.S.C. 154(b) by 354 days.

(21) Appl. No.: 17/151,479

(22) Filed: Jan. 18, 2021

(65) Prior Publication Data

US 2022/0232069 A1   Jul. 21, 2022

(51) Int. Cl.
*H04L 29/08*   (2006.01)
*G06F 9/455*   (2018.01)
(Continued)

(52) U.S. Cl.
CPC ...... *H04L 67/1012* (2013.01); *G06F 9/45558* (2013.01); *H04L 67/02* (2013.01);
(Continued)

(58) Field of Classification Search
CPC . H04L 67/1012; H04L 67/02; H04L 67/1097; H04L 67/142; G06F 9/45558; G06F 2009/4557; G06F 2009/45595
(Continued)

(56) References Cited

U.S. PATENT DOCUMENTS 8,522,139 B2 * 8/2013 Gilboa ............... G06F 8/38
715/243
8,719,780 B2 * 5/2014 Selitser ............... H04L 67/02
717/106

(Continued)

FOREIGN PATENT DOCUMENTS

CA   2505580 C   * 8/2011 ............ G06F 17/211
CN   102729476 B   * 10/2014 ......... B29C 67/0088
(Continued)

*Primary Examiner* — David R Lazaro
*Assistant Examiner* — Berhanu Shitayewoldetadik
(74) *Attorney, Agent, or Firm* — Quarles & Brady LLP

(57) ABSTRACT

The current document is directed to improved distributed service-oriented applications developed according to a new and improved architecture for developing distributed service-oriented applications. The new and improved architecture includes a stateless-communications-protocol interface to external users and clients, services implemented by actors that communicate using message passing, and a distributed data grid for persistent storage of data. Distributed service-oriented applications developed according to the new and improved architecture are referred to as "RAD-squared applications" ("RAD^2 applications"). The acronym "RAD^2" stands for "Rapid Application Development with REST-actor-data-grid" and the acronym "REST" stands for the Representational State Transfer ("REST") protocol. Alternative stateless communications protocols can be used as alternatives to REST in RAD^2 applications. Distributed service-oriented applications developed in conformance with the new and improved RAD^2 architecture provides more efficient scaling operations and workload-balancing operations eliminating the need for application re-architecture under changing load conditions.

20 Claims, 46 Drawing Sheets

(51) Int. Cl.
  *G06F 15/16* (2006.01)
  *H04L 15/16* (2006.01)
  *H04L 67/02* (2022.01)
  *H04L 67/1012* (2022.01)
  *H04L 67/1097* (2022.01)
  *H04L 67/142* (2022.01)

(52) U.S. Cl.
  CPC ........ *H04L 67/1097* (2013.01); *H04L 67/142* (2013.01); *G06F 2009/4557* (2013.01); *G06F 2009/45595* (2013.01)

(58) Field of Classification Search
  USPC .......................................................... 709/223
  See application file for complete search history.

(56) References Cited

U.S. PATENT DOCUMENTS

| | | | | |
|---|---|---|---|---|
| 9,258,379 | B2* | 2/2016 | Jansson | H04L 67/562 |
| 10,136,296 | B1* | 11/2018 | Dames | H04W 4/90 |
| 10,320,891 | B2* | 6/2019 | Agarwal | H04L 47/125 |
| 10,553,119 | B1* | 2/2020 | Shah | G06Q 50/40 |
| 10,817,530 | B2* | 10/2020 | Siebel | G06F 16/283 |
| 10,893,402 | B2* | 1/2021 | Dames | H04L 67/12 |
| 2004/0064548 | A1* | 4/2004 | Adams | H04L 67/1012 |
| | | | | 709/224 |
| 2004/0148586 | A1* | 7/2004 | Gilboa | G06F 40/197 |
| | | | | 705/348 |
| 2007/0112574 | A1* | 5/2007 | Greene | H04W 12/086 |
| | | | | 709/201 |
| 2008/0207183 | A1* | 8/2008 | Root | H04L 67/306 |
| | | | | 455/414.2 |
| 2009/0006992 | A1* | 1/2009 | Gilboa | G06Q 10/067 |
| | | | | 715/763 |
| 2010/0050152 | A1* | 2/2010 | Gilboa | G06F 40/166 |
| | | | | 717/106 |
| 2011/0047230 | A1* | 2/2011 | McGee | H04L 69/40 |
| | | | | 709/217 |
| 2011/0248863 | A1* | 10/2011 | Johnson | H04L 67/53 |
| | | | | 340/686.1 |
| 2011/0321011 | A1* | 12/2011 | Selitser | G06F 9/542 |
| | | | | 717/120 |
| 2012/0210012 | A1* | 8/2012 | Jansson | H04L 67/562 |
| | | | | 709/230 |
| 2013/0318454 | A1* | 11/2013 | Gilboa | G06F 40/103 |
| | | | | 715/763 |
| 2013/0339475 | A1* | 12/2013 | Kataria | H04L 45/46 |
| | | | | 709/217 |
| 2015/0057837 | A1* | 2/2015 | Moore, Jr. | G06Q 10/02 |
| | | | | 701/1 |
| 2015/0100466 | A1* | 4/2015 | Deguchi | G06Q 10/06 |
| | | | | 705/28 |
| 2015/0109104 | A1* | 4/2015 | Fadell | G08B 27/005 |
| | | | | 340/5.7 |
| 2015/0358955 | A1* | 12/2015 | Kresse | H04L 67/12 |
| | | | | 370/329 |
| 2016/0085738 | A1* | 3/2016 | Briggs | G06F 40/18 |
| | | | | 715/219 |
| 2016/0239465 | A1* | 8/2016 | Gilboa | G06F 9/451 |
| 2017/0006135 | A1* | 1/2017 | Siebel | H04L 67/53 |
| 2017/0214738 | A1* | 7/2017 | Agarwal | H04L 47/125 |
| 2018/0054490 | A1* | 2/2018 | Wadhwa | G08G 1/0129 |
| 2018/0103110 | A1* | 4/2018 | Koren | H04L 67/1001 |
| 2018/0157543 | A1* | 6/2018 | Bellomo | G06F 9/546 |
| 2018/0191867 | A1* | 7/2018 | Siebel | H04L 67/61 |
| 2018/0285767 | A1* | 10/2018 | Chew | G06N 20/00 |
| 2018/0294851 | A1* | 10/2018 | Cao | H04B 7/0452 |
| 2018/0350144 | A1* | 12/2018 | Rathod | G06Q 20/3224 |
| 2019/0124162 | A1* | 4/2019 | Koren | H04L 67/1001 |
| 2019/0265971 | A1* | 8/2019 | Behzadi | G06Q 10/06 |
| 2019/0297484 | A1* | 9/2019 | Dames | H04W 4/90 |
| 2020/0053540 | A1* | 2/2020 | Dames | H04L 67/55 |
| 2020/0162612 | A1* | 5/2020 | Mullane | G06Q 30/0281 |
| 2020/0204618 | A1* | 6/2020 | Agarwal | H04L 63/1458 |
| 2021/0019325 | A1* | 1/2021 | Edge | G06F 16/254 |
| 2021/0209144 | A1* | 7/2021 | Trim | G06F 16/367 |
| 2022/0070236 | A1* | 3/2022 | Yerli | H04L 63/0861 |
| 2022/0075595 | A1* | 3/2022 | Agrawal | G06F 7/4876 |

FOREIGN PATENT DOCUMENTS

| | | | | |
|---|---|---|---|---|
| CN | 107463434 A | * | 12/2017 | ............ G06F 9/466 |
| CN | 107463434 B | * | 8/2021 | ............ G06F 9/466 |
| WO | WO-2019183542 A1 | * | 9/2019 | ............ H04L 67/12 |
| WO | WO-2020069154 A1 | * | 4/2020 | ........... A61B 5/0022 |
| WO | WO-2020072501 A1 | * | 4/2020 | ............ G06N 3/08 |

* cited by examiner

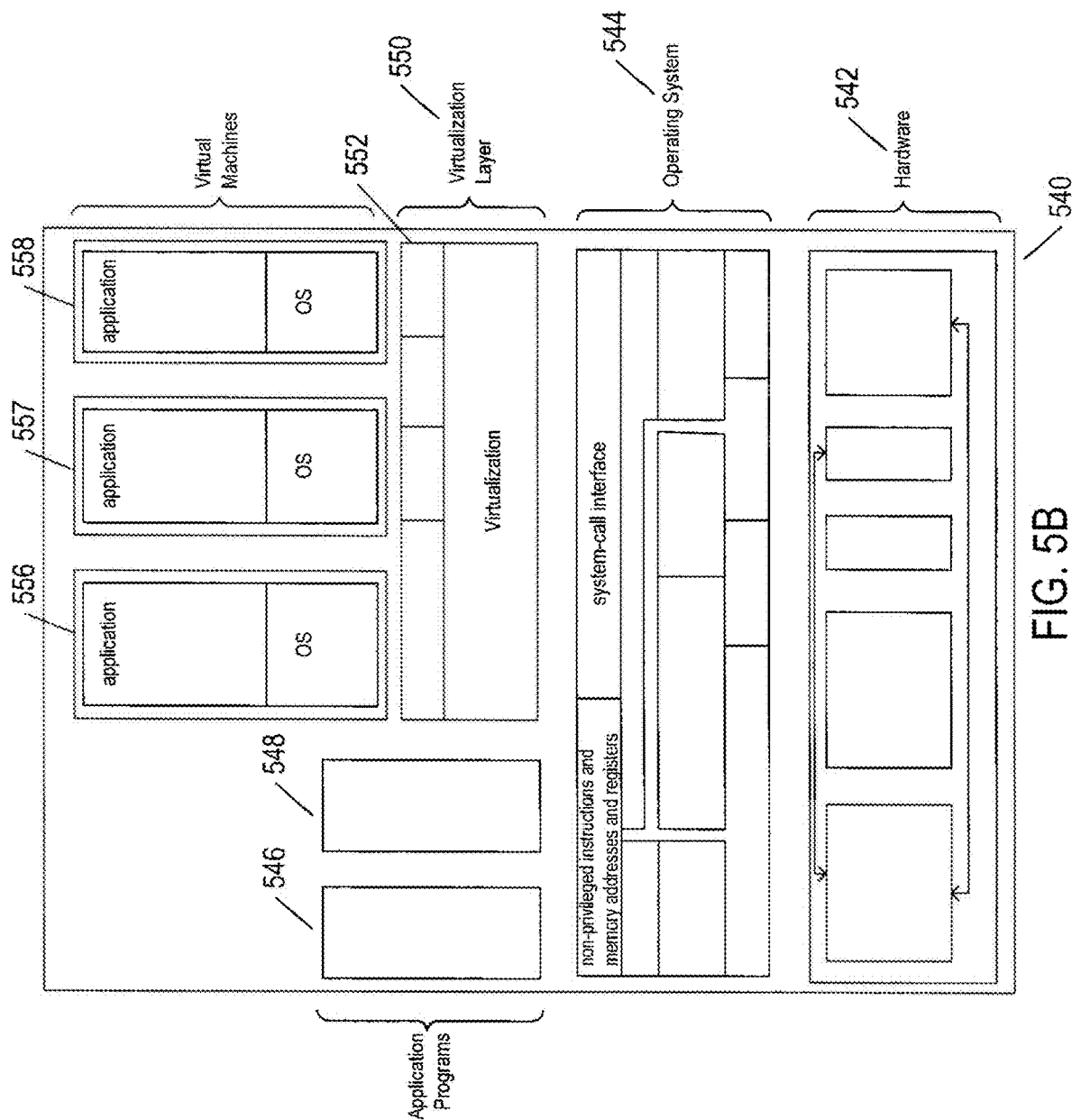

```
const int MAX_TO_NODES = 10;                    /← 2002
const int MAX_EDGES = 100;
const double damp = 0.1;                        ⎫
const double oneMinusDamp = 1 - damp;           ⎬ 2003
const double SINK_COEFFICIENT = 3.0;            ⎭← 2004
const double THRESHOLD = 0.0001;                    ← 2005 class node;
using NodePtr = node*;                          ← 2006
class edge;
using EdgePtr = edge*;                          ← 2007

⎧ class edge
       ⎪ {
       ⎪     private:
       ⎪         NodePtr node1;    ⎫ 2010
       ⎪         NodePtr node2;    ⎭       ← 2011
       ⎪         int msgs_1to2, msgs_2to1;
2008 ⎨           bool rt1, rt2;           ← 2012
       ⎪     public:
       ⎪       ⎧ edge();
       ⎪       ⎪ void init(NodePtr n1, NodePtr n2, int n1_to_n2, int n2_to_n1, bool r1, bool r2);
       ⎪  2013⎨ NodePtr getN1() { return node1; };
       ⎪       ⎪ NodePtr getN2() { return node2; };
       ⎪       ⎪ int getN1toN2() { return msgs_1to2; };
       ⎪       ⎩ int getN2toN1() { return msgs_2to1; };
       ⎩ };

⎧ struct internalNode
       ⎪ {                     ← 2015
       ⎪     NodePtr node;     ← 2016
2013 ⎨       double f;
       ⎪     double fComb;     ← 2017
       ⎪     bool returnMsg;
       ⎩ };                    ← 2018
```

FIG. 20A

```
class node
{
    private:
        double p;
        double work;                                    } 2022 internalNode toNodes[MAX_TO_NODES];  ——— 2023
        int numToNodes; ———————— 2024
        int numOut;
        int numOnly;  ———————— 2025
                       ———————— 2026
        bool ePoint;

double outgoing;
        double incoming;
        double incomingWork;                            } 2027
        double remaining;

double newWork;
        double numWork;                                 } 2028
        double normalizedWork;

public:
        node();  ———— 2029 void addToNode(NodePtr n, int num, bool r);  ——— 2031
        void distributions();  ———————— 2032 double next(double left);  ——————— 2033
        double nextFinish();  ——————— 2034 void receiveMsgs(double msgs) { incoming += msgs; };   } 2035
        void receiveWork(double wrk) { incomingWork += wrk; };

double getP() { return p; };
        void setP(double pVal) { p = pVal; };
        double getWork() { return work; };
        double getNormalizedWork() { return normalizedWork; };
        void setNormalizedWork(double nw) { normalizedWork = nw; };
        void setWork(double wVal) { work = wVal; };
        void setEPoint(bool v) { ePoint = v; };
        bool getPoint() { return ePoint; };
        int getNumToNodes() { return numToNodes; };
};
```

FIG. 20B

```
class graph                    ┌─ 2041
{
    private:                   ┌─ 2042
        NodePtr nodes;        ┌─ 2043
        int numNodes;
        EdgePtr edges;    ┌─ 2044
        int numEdges;
        NodePtr endPoints; ──── 2045
        int numEndPoints; ──── 2046
        double* endPointMsgs; ──── 2047
                                              ─ 2048
        void printCurrentNodeValues(double left);

public:
        graph(int numN, int numEPs);  ─ 2049
        ~graph(); ──── 2050
        void addEdge(int n1, bool ePoint1, int n2, bool ePoint2, ─ 2051
                     int n1_to_n2, int n2_to_n1, bool r1, bool r2);
        void initiate();
        void run();       ─ 2052
};                  ─ 2053
```
⎫
⎬ 2040
⎭

FIG. 20C

```
node::node()
{
    p = 0;
    work = 0;

for (int i = 0; i < MAX_TO_NODES; i++)
    {
        toNodes[i].node = NULL;
        toNodes[i].f = 0;
        toNodes[i].fComb = 0;
        toNodes[i].returnMsg = false;
    }
    numToNodes = 0;
    numOut = 0;
    numOnly = 0;

ePoint = false;

outgoing = 0;
    incoming = 0;
    incomingWork = 0;
    remaining = 0;

newWork = 0;
    numWork = 0;
    normalizedWork = 0;
}                                                       } 2102 void node::addToNode(NodePtr n, int num, bool r)
{
    toNodes[numToNodes].node = n;
    toNodes[numToNodes].returnMsg = r;
    if (r)
    {
        numOnly++;
        toNodes[numToNodes++].fComb = num;
    }
    else
    {
        numOut++;
        toNodes[numToNodes].f = num;
        toNodes[numToNodes++].fComb = num;
    }
}                                                       } 2103
```

FIG. 21A

```
void node::distributions()
{
    double sum = 0;

if (numToNodes > 0)
    {
        for (int i = 0; i < numToNodes; i++) sum += toNodes[i].f;
        if (sum > 0)
            for (int i = 0; i < numToNodes; i++) toNodes[i].f /= sum;
        else numToNodes = 0;
        sum = 0;
        for (int i = 0; i < numToNodes; i++) sum += toNodes[i].fComb;
        if (sum > 0)
            for (int i = 0; i < numToNodes; i++) toNodes[i].fComb /= sum;
        else numToNodes = 0;
    }
}
```
} 2104

FIG. 21B

```
double node::next(double left)
{
    double ret = 0.0;
    double trans = 0.0;
    int numOnly = 0;

if (ePoint)
    {
        trans = p * left;
        if (trans > 0)
            for (int i = 0; i < numToNodes; i++)
                toNodes[i].node->receiveMsgs(trans * toNodes[i].f);    } 2106
    }
    else
    {
        if (p > 0)
        {
            if (numOut > 0)
            {
                remaining = damp * p;            — 2108
                outgoing = oneMinusDamp * p;     — 2109
            }
            else
            {
                remaining = 0;    — 2110
                outgoing = p;     — 2111
            }
            if (numOut > 0)
                for (int i = 0; i < numToNodes; i++)
                    toNodes[i].node->receiveMsgs(outgoing * toNodes[i].f);    } 2112
            else
            {
                ret = outgoing;
                work += (SINK_COEFFICIENT * outgoing);    } 2113
            }
            if (numToNodes > 0)
            {
                for (int i = 0; i < numToNodes; i++)
                    toNodes[i].node->receiveWork(outgoing * toNodes[i].fComb);    } 2114
                newWork += outgoing;
            }
        }
    }
    return ret;
}
```

FIG. 21C

```
double node::nextFinish()
{
    if (!ePoint)
    {
        double newP = remaining + incoming;   ⎫
        double ret = p - newP;                ⎬ 2117
        ret *= ret;                           ⎭ newWork += incoming + incomingWork;         ⎫
        numWork += 1.0;                             ⎬ 2118
        work = work + ((newWork - work) / numWork); ⎪
        newWork = 0;                                ⎭ remaining = 0;        ⎫
        outgoing = 0;         ⎬ 2119
        incoming = 0;         ⎪
        incomingWork = 0;     ⎭
        p = newP;
        return ret;    ⟵ 2120
    }
    else return 0;
} graph::graph(int numN, int numEPs)
{
    numNodes = numN;
    numEndPoints = numEPs;

nodes = new node[numNodes];
    for (int i = 0; i < numNodes; i++) nodes[i].setEPoint(false);

endPoints = new node[numEndPoints];
    for (int i = 0; i < numEndPoints; i++) endPoints[i].setEPoint(true);

edges = new edge[MAX_EDGES];
    numEdges = 0;

endPointMsgs = new double[numEndPoints];
    for (int i = 0; i < numEndPoints; i++) endPointMsgs[i] = 0.0;
} graph::~graph()
{
    delete[] nodes;
    delete[] endPoints;
    delete[] edges;
    delete[] endPointMsgs;
}
```

{2116, 2122, 2123 braces}

FIG. 21D

```
void graph::addEdge(int n1, bool ePoint1, int n2, bool ePoint2, int n1_to_n2, int
n2_to_n1, bool r1, bool r2)
{
    NodePtr N1;
    NodePtr N2;

if (ePoint1)
    {
        N1 = &(endPoints[n1 - 1]);
        endPointMsgs[n1 - 1] += (double)n1_to_n2;          —— 2125
    }
    else N1 = &(nodes[n1 - 1]);

if (ePoint2)
    {
        N2 = &(endPoints[n2 - 1]);
        endPointMsgs[n2 - 1] += (double)n2_to_n1;          —— 2126
    }
    else N2 = &(nodes[n2 - 1]);

edges[numEdges++].init(N1, N2, n1_to_n2, n2_to_n1, r1, r2);

if (n1_to_n2 > 0 && !N2->getPoint()) N1->addToNode(N2, n1_to_n2, r1);
    if (n2_to_n1 > 0 && !N1->getPoint()) N2->addToNode(N1, n2_to_n1, r2);  } 2128
}                                                                                         ⎬ 2124 void graph::initiate()
{
    double sum = 0;

for (int i = 0; i < numNodes; i++)
    {
        nodes[i].setP(0);
        nodes[i].setEPoint(false);               } 2132
        nodes[i].distributions();
    } for (int i = 0; i < numEndPoints; i++) sum += endPointMsgs[i];   } 2134
    for (int i = 0; i < numEndPoints; i++) endPointMsgs[i] /= sum;

for (int i = 0; i < numEndPoints; i++)
    {
        endPoints[i].setP(endPointMsgs[i]);
        endPoints[i].setEPoint(true);            } 2136
        endPoints[i].distributions();
    }
}                                                                          ⎬ 2130
```

FIG. 21E

```
void graph::run()
{
    double sqDiffs = 0;
    double newSqDiffs = 0;
    double diff;
    double left = 1;
    double newLeft = 0;
    double sum = 0;

do
    {
        sqDiffs = newSqDiffs;
        newSqDiffs = 0;
        for (int i = 0; i < numEndPoints; i++) endPoints[i].next(left);
        for (int i = 0; i < numNodes; i++) newLeft += nodes[i].next(0);
        for (int i = 0; i < numNodes; i++) newSqDiffs += nodes[i].nextFinish();
        for (int i = 0; i < numNodes; i++) sum += nodes[i].getWork();
        for (int i = 0; i < numNodes; i++)
                nodes[i].setNormalizedWork(nodes[i].getWork() / sum);
        sum = 0;
        left = newLeft;
        newLeft = 0;

printCurrentNodeValues(left);

newSqDiffs = sqrt(newSqDiffs);
        diff = sqDiffs - newSqDiffs;
        if (diff < 0) diff = -diff;
    } while (diff > THRESHOLD);
} int main()
{
    graph g(49, 4);

g.addEdge(1, true, 1, false, 2550, 2550, false, true);
    g.addEdge(1, true, 9, false, 2575, 2575, false, true);
                    :
                    :
    g.addEdge(45, false, 49, false, 816, 0, false, false);

g.initiate();
    g.run();
    return 0;
}
```

- 2140 (outer do-while block)
- 2142 (first group of for loops)
- 2144 (setNormalizedWork loop)
- 2146 (inner block)
- 2147 (while condition)
- 2148 (main function)
- 2149 (graph g(49, 4);)
- 2150 (addEdge calls)
- 2151 (continuation)
- 2152 (g.initiate();)
- 2153 (g.run();)

FIG. 21F

Work Values 1.000000

Nodes:

1 - 0.012192  2 - 0.007466  3 - 0.047973  4 - 0.002375
5 - 0.007466  6 - 0.045783  7 - 0.002560  8 - 0.062375
9 - 0.012329  10 - 0.007496  11 - 0.047778  12 - 0.002417
13 - 0.007584  14 - 0.002446  15 - 0.048329  16 - 0.061547
17 - 0.007697  18 - 0.002316  19 - 0.001654  20 - 0.010882
21 - 0.010882  22 - 0.002127  23 - 0.011137  24 - 0.011137
25 - 0.002876  26 - 0.030428  27 - 0.033437  28 - 0.013000  } 2204
29 - 0.074476  30 - 0.038624  31 - 0.007504  32 - 0.002801
33 - 0.024789  34 - 0.013928  35 - 0.020312  36 - 0.026569
37 - 0.012967  38 - 0.074463  39 - 0.038026  40 - 0.006997
41 - 0.002850  42 - 0.024934  43 - 0.013823  44 - 0.021576
45 - 0.004890  46 - 0.020840  47 - 0.020840  48 - 0.018930
49 - 0.014171

Clusters:

ACTOR-AND-DATA-GRID-BASED DISTRIBUTED APPLICATIONS

TECHNICAL FIELD

The current document is directed to distributed-computer-systems and, in particular, to distributed applications with stateless-protocol interfaces, actor-based application nodes that access a distributed data grid, and automated load balancing.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, distributed-system management, and distribute-application management. As new distributed-computing technologies are developed, and as general hardware and software technologies continue to advance, the current trend towards ever-larger and more complex distributed computing systems appears likely to continue well into the future.

During the past 10 years, distributed applications based on micro services have become a prominent architecture for distributed-application development. Distributed service-oriented applications provide many advantages to distributed-application developers and to those who configure and manage distributed applications in cloud-computing facilities and other distributed-computational environments. However, distributed service-oriented applications have also presented many new problems and challenges, including problems and challenges associated with distributing service instances among the computational resources within a distributed-computing system and redistributing the service instances in order to respond to changes in distributed-application workloads. Distributed-application developers and users, as well as cloud-computing-facility administrators and managers, continue to seek improved methods for developing distributed service-oriented applications and improved architectures for distributed-service-oriented-applications to address these problems and challenges associated with traditional distributed service-oriented applications.

SUMMARY

The current document is directed to improved distributed service-oriented applications developed according to a new and improved architecture for developing distributed service-oriented applications. The new and improved architecture includes a stateless-communications-protocol interface to external users and clients, services implemented by actors that communicate using message passing, and a distributed data grid for persistent storage of data. Distributed service-oriented applications developed according to the new and improved architecture are referred to as "RAD-squared applications" ("RAD^2 applications"). The acronym "RAD^2" stands for "Rapid Application Development with REST-actor-data-grid" and the acronym "REST" stands for the Representational State Transfer ("REST") protocol. Alternative stateless communications protocols can be used as alternatives to REST in RAD^2 applications. Distributed service-oriented applications developed in conformance with the new and improved RAD^2 architecture provides more efficient scaling operations and workload-balancing operations eliminating the need for application re-architecture under changing load conditions.

BRIEF DESCRIPTION OF THE DRAWINGS

FIGS. 5A-D illustrate two types of virtual machine and virtual-machine execution environments.

FIGS. 20A-C and 21A-F show a simple C++ implementation of the workload-estimation method for determining the percentages of a total workload handled by each actor, as in the example discussed above with reference to FIGS. 18A-C.

FIG. 22 illustrates the workload-distribution results generated by applying the workload-distribution calculation shown in the C++ implementation discussed above with reference to FIGS. 20A-21F to the graph shown in FIG. 18C.

DETAILED DESCRIPTION

Figure 1:
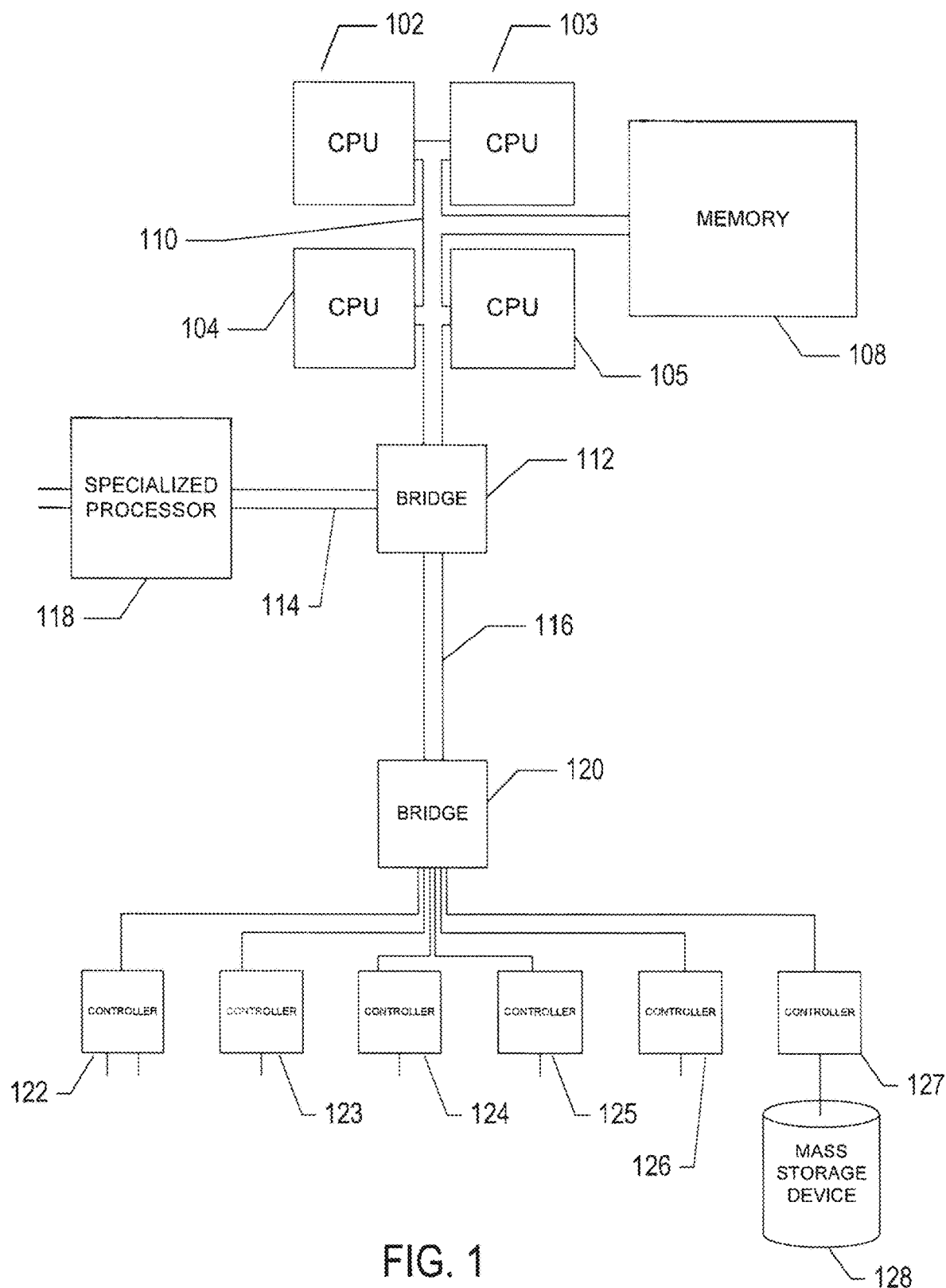
FIG. 1 provides a general architectural diagram for various types of computers.

The current document is directed to distributed service-oriented applications developed according to a new and improved architecture. In a first subsection, below, a detailed description of computer hardware, complex computational systems, and virtualization is provided with reference to FIGS. 1-10. An overview of distributed service-oriented applications is provided in a second subsection, with reference to FIGS. 11-12. The currently disclosed methods and systems are discussed with reference to FIGS. 13A-2413 in a third and final subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
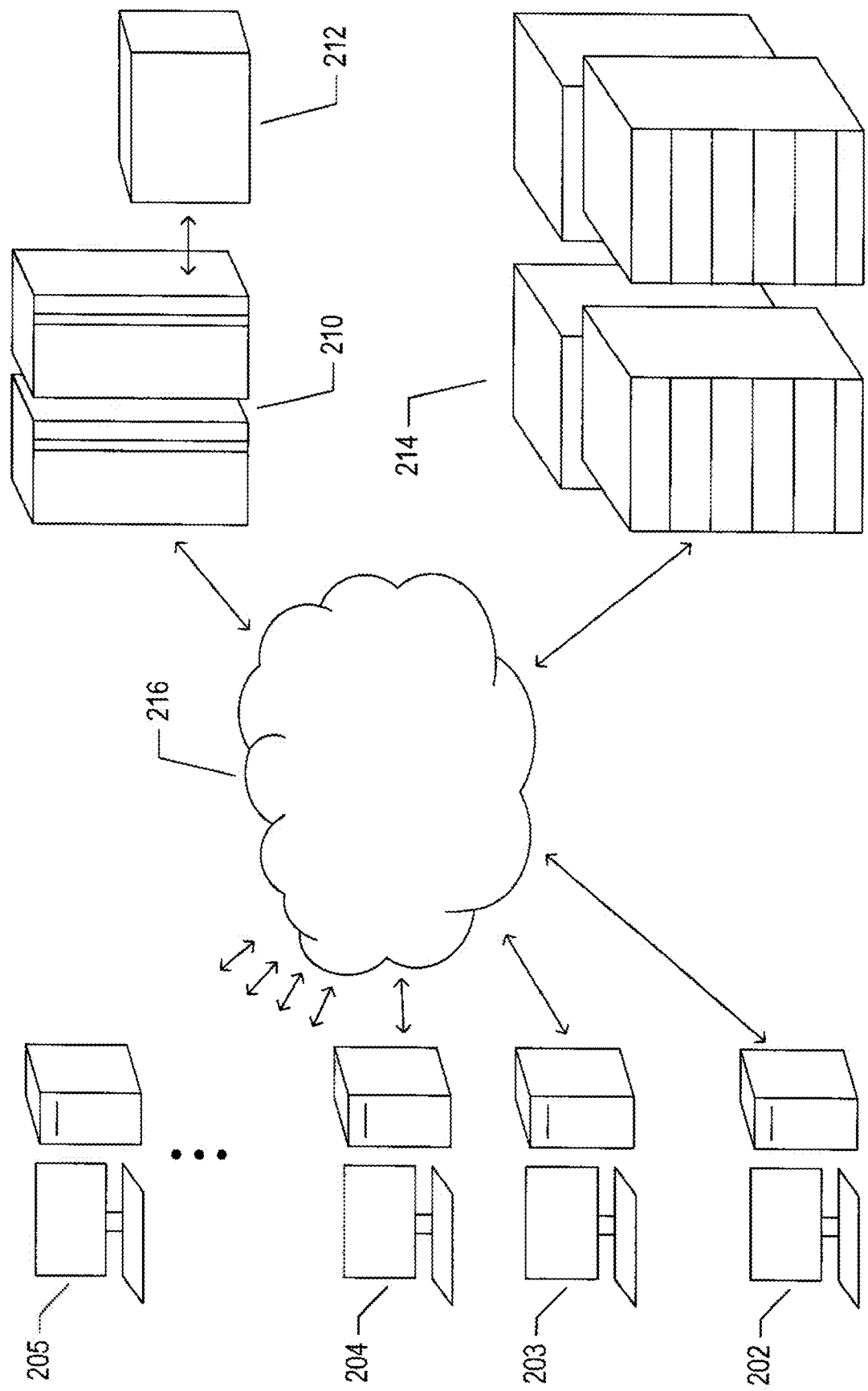
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
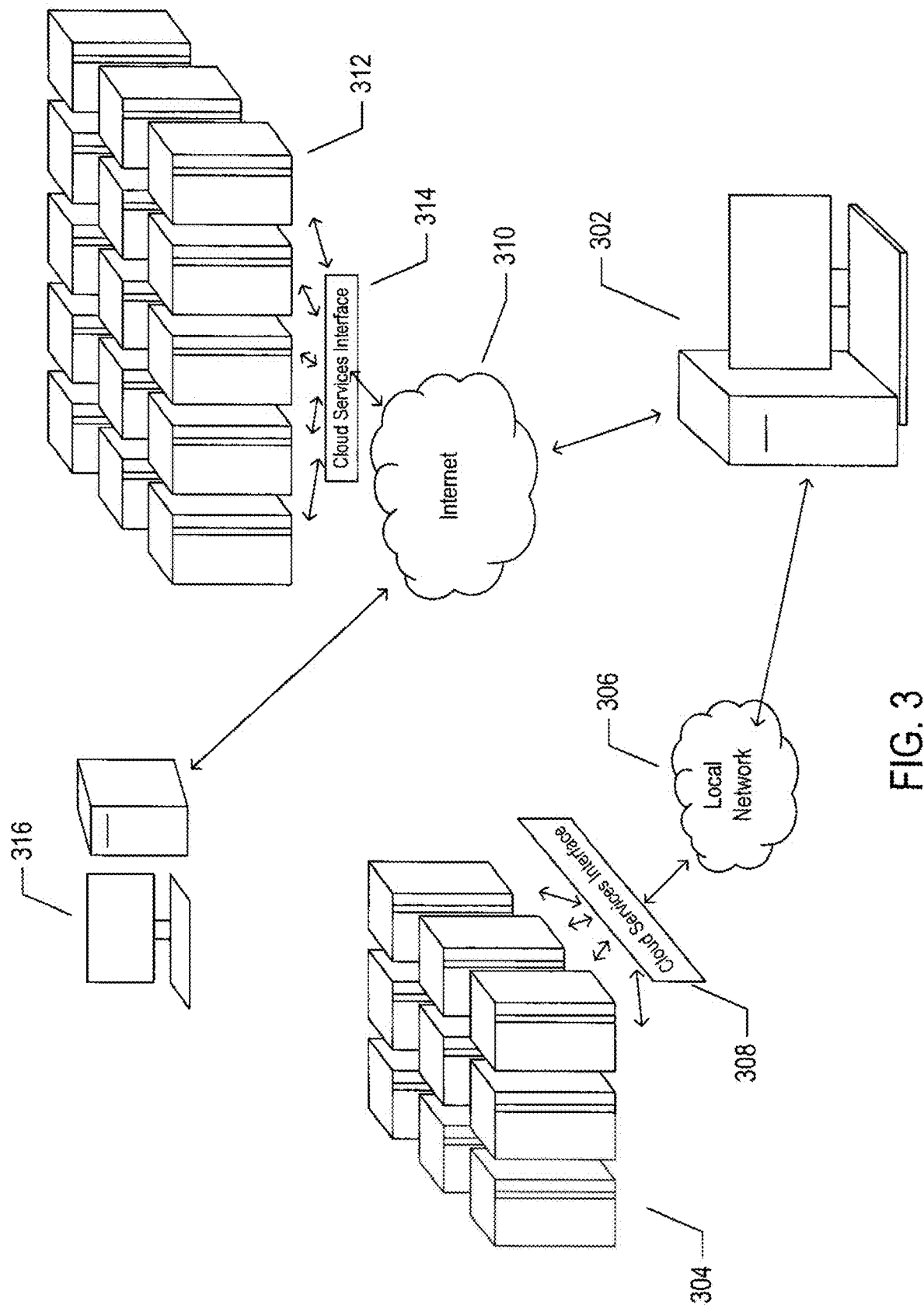
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
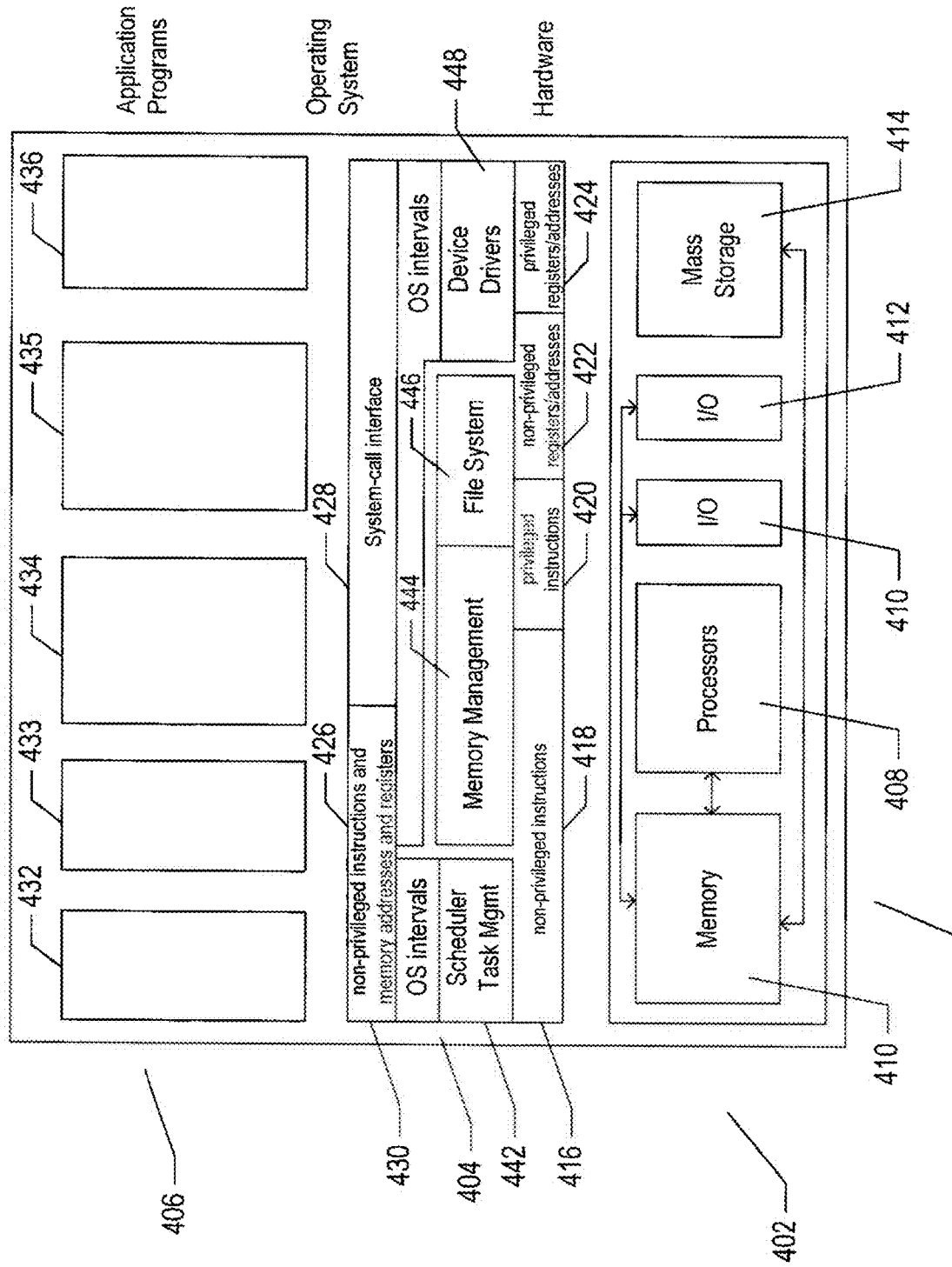
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and workload-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
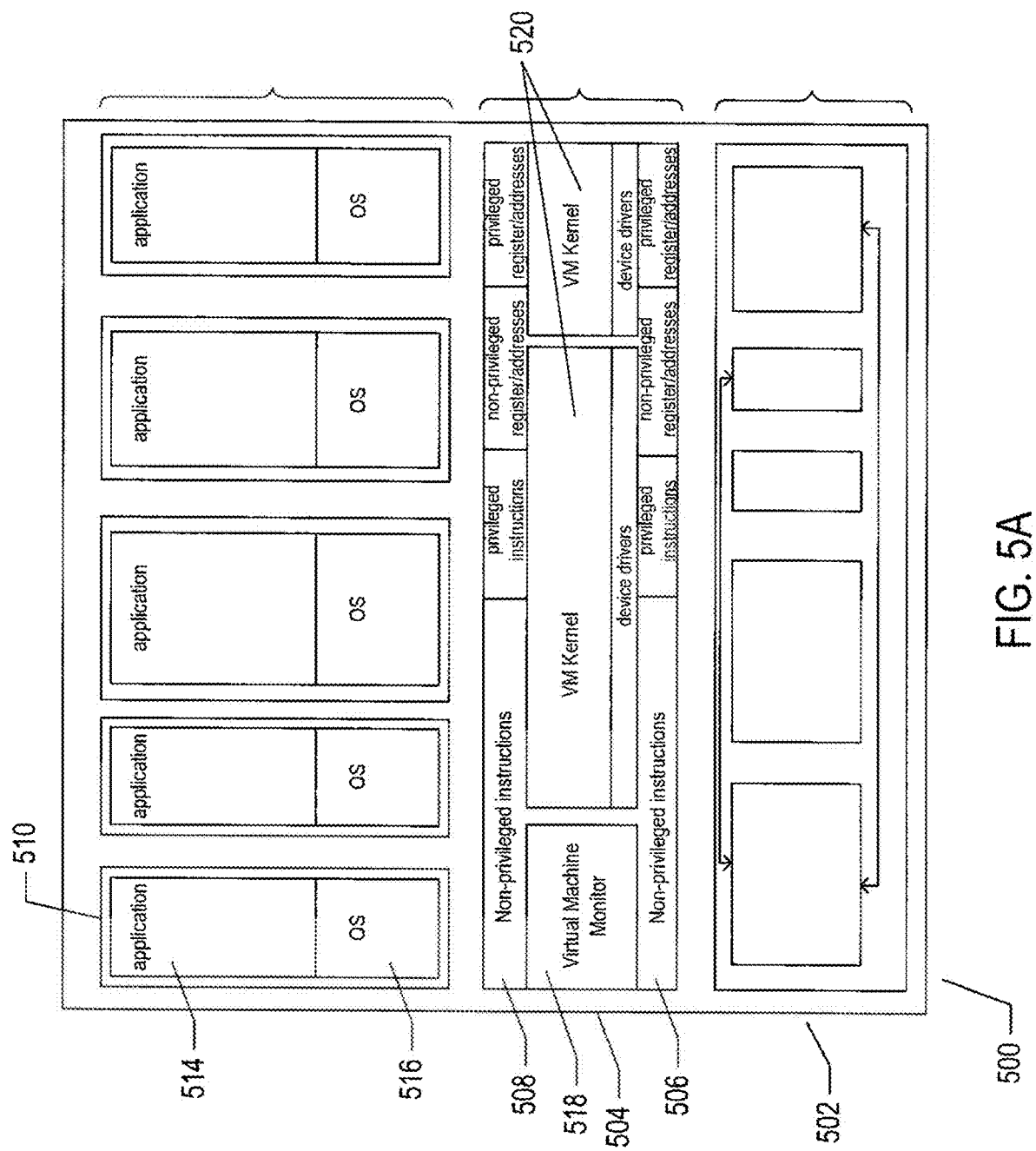

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. Figure 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
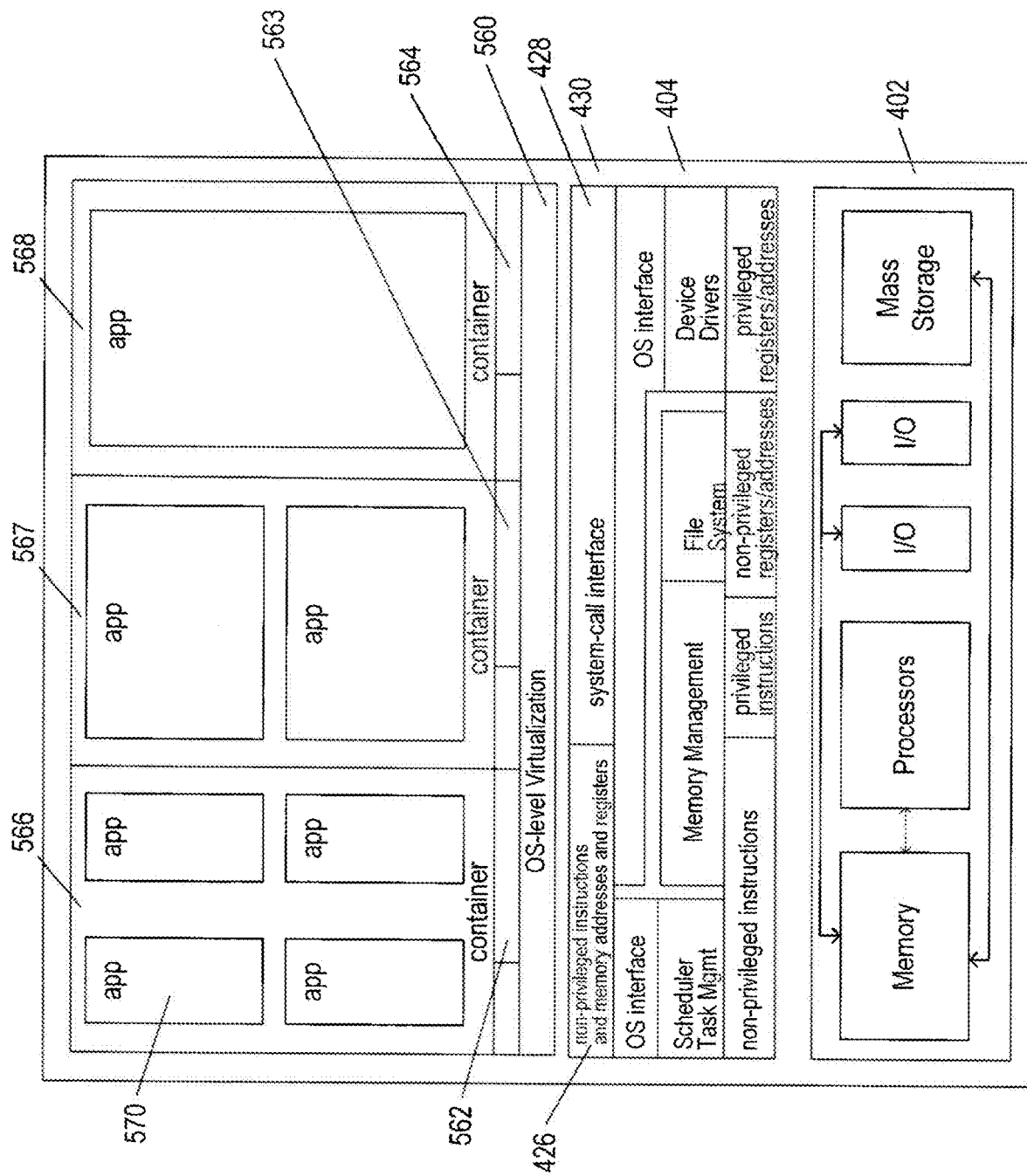

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
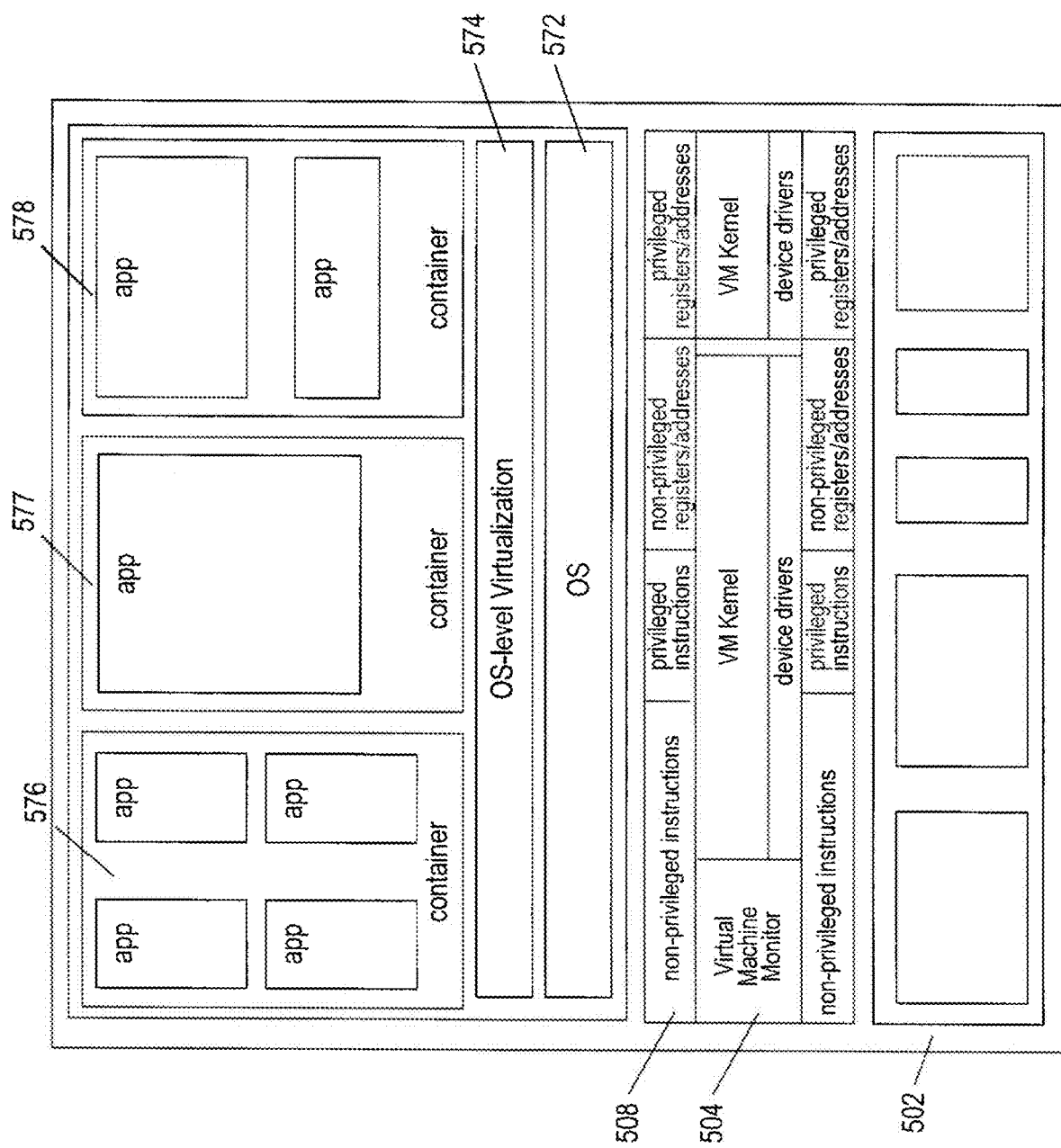

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
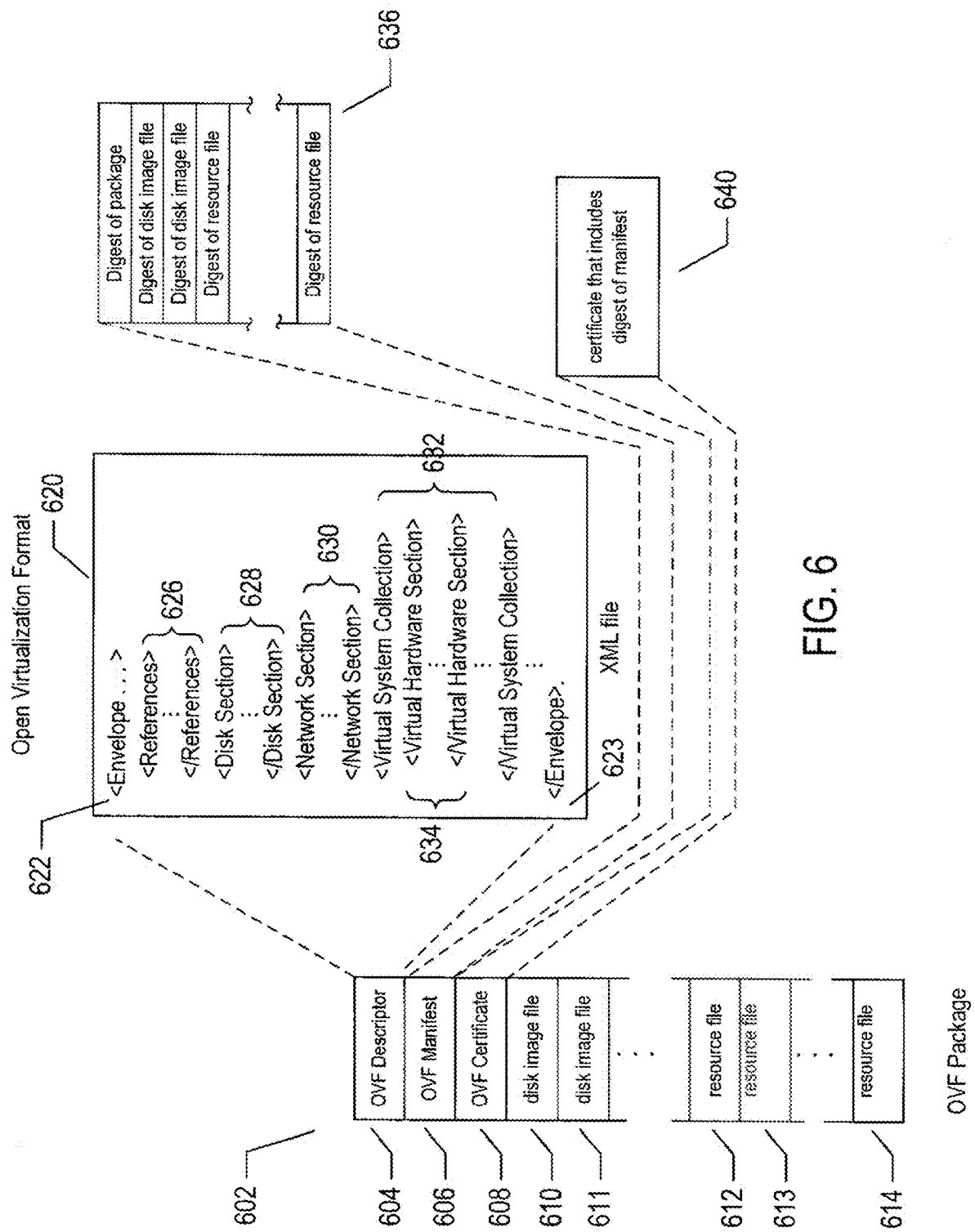
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
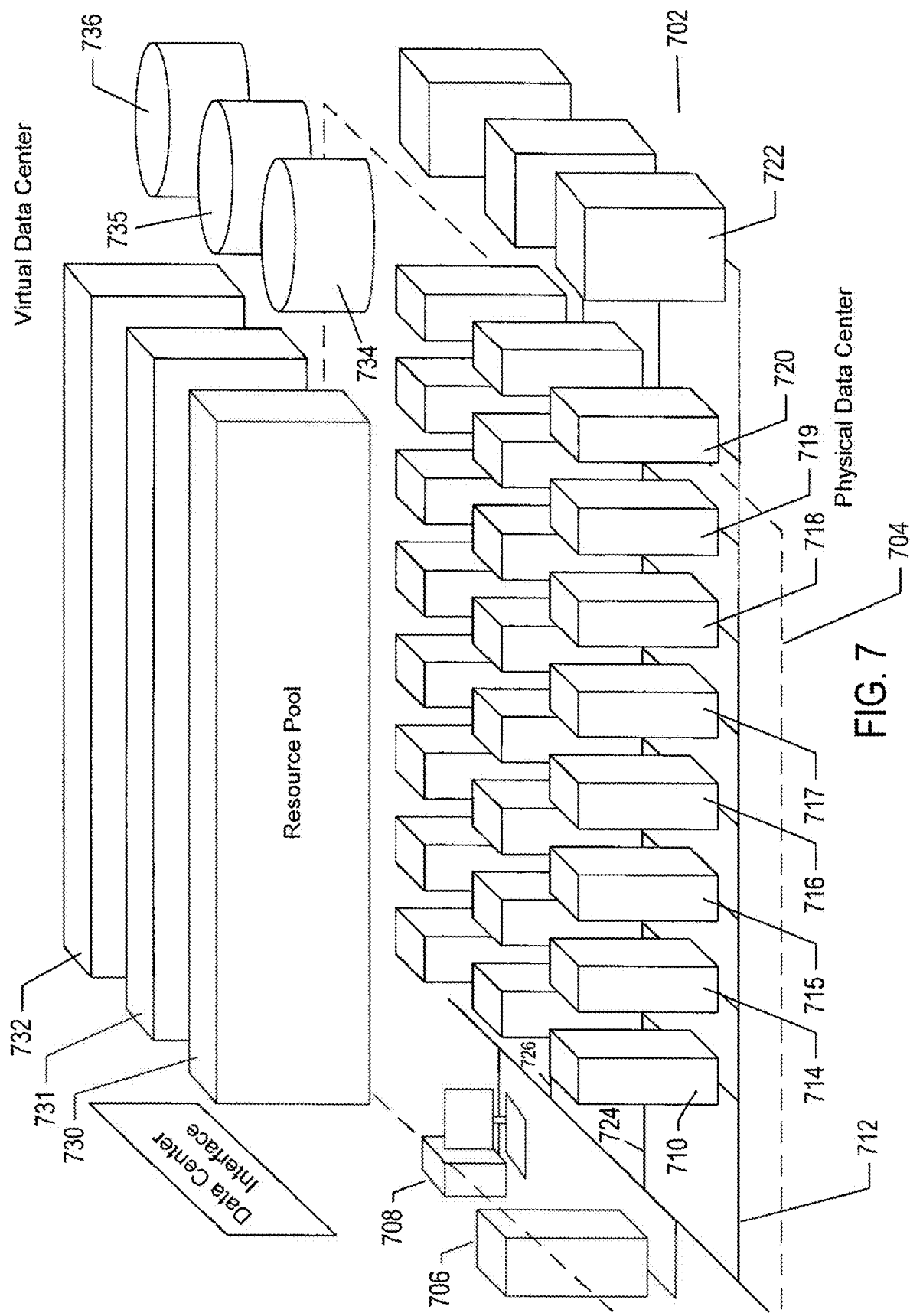
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
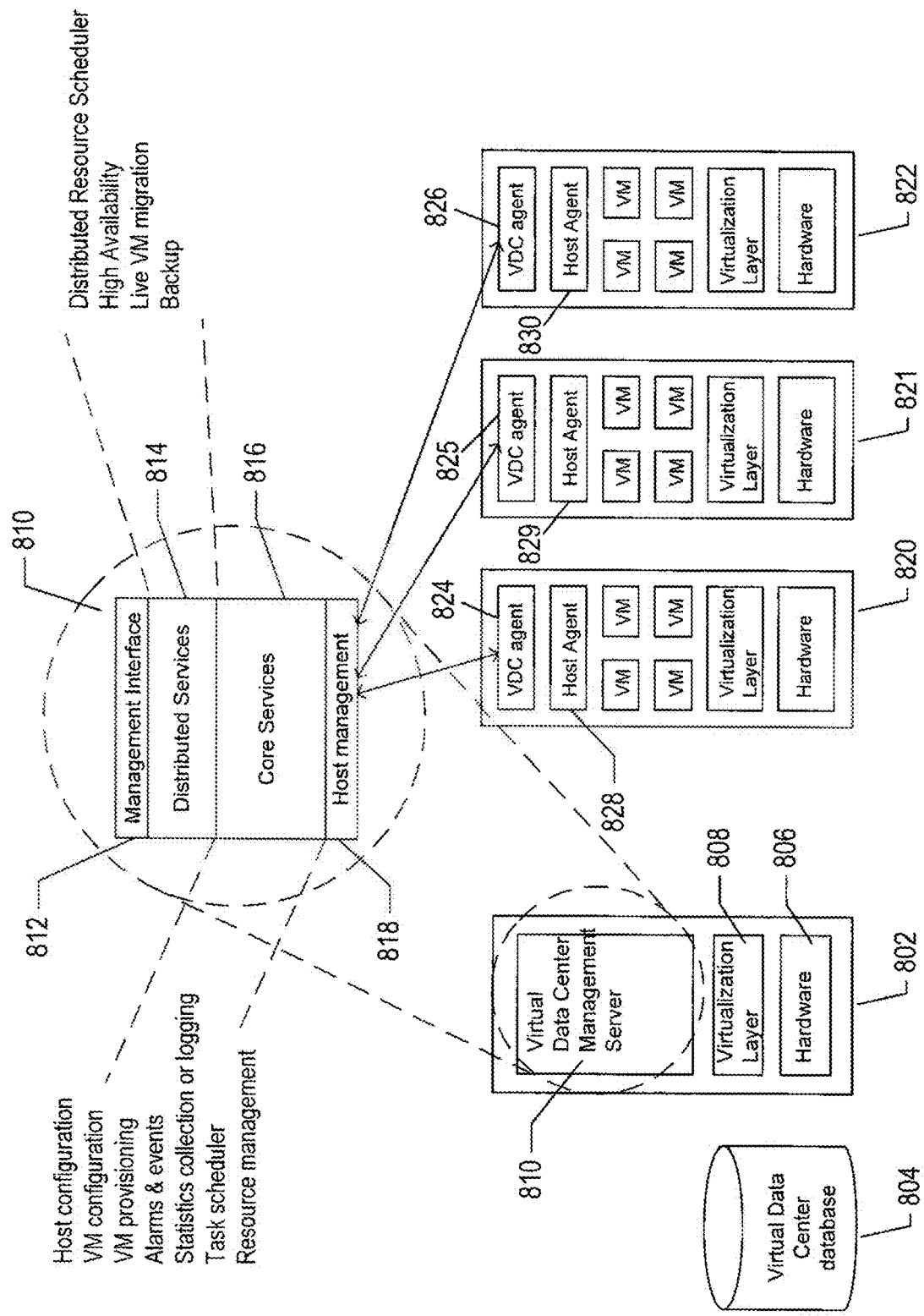
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
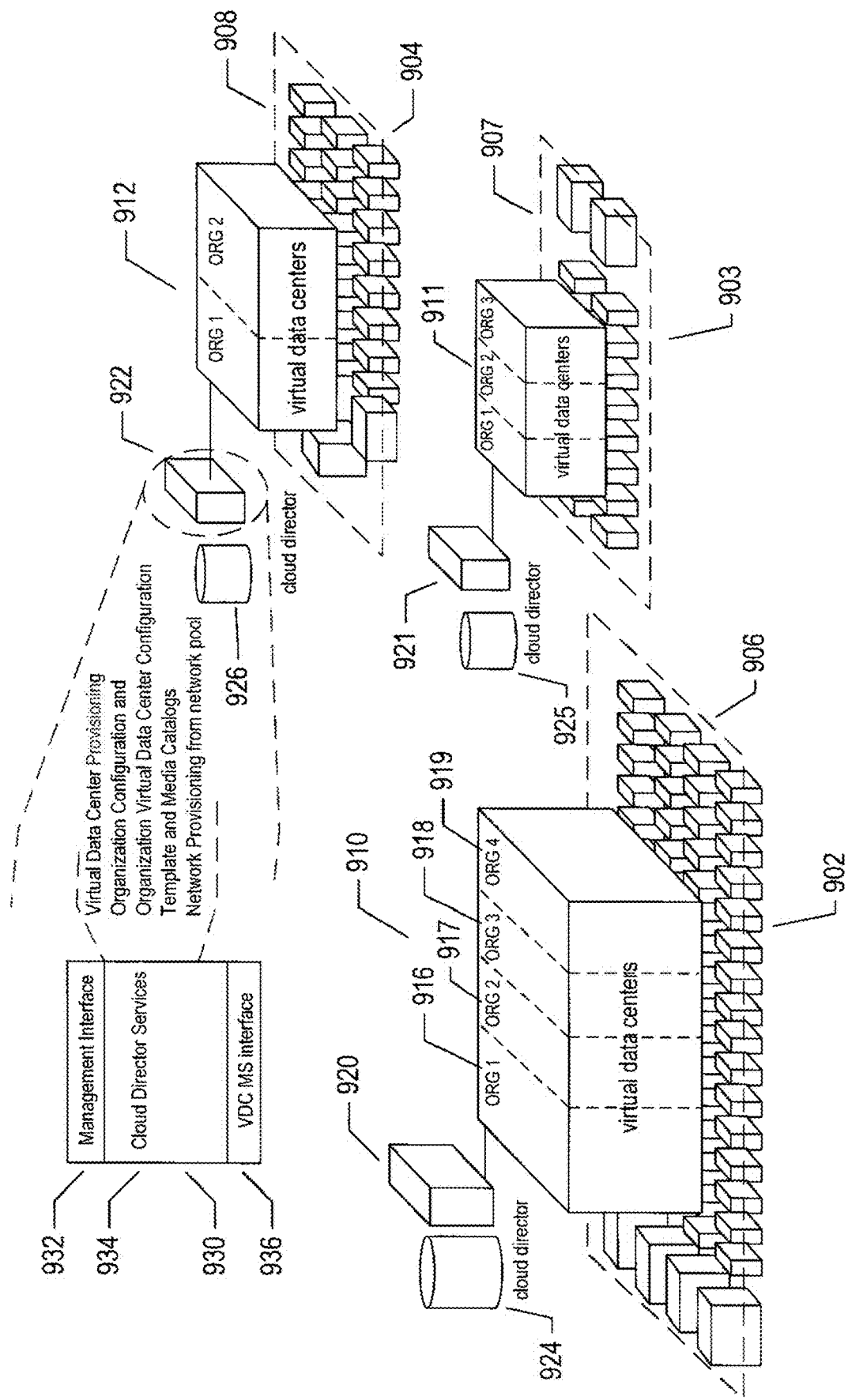
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
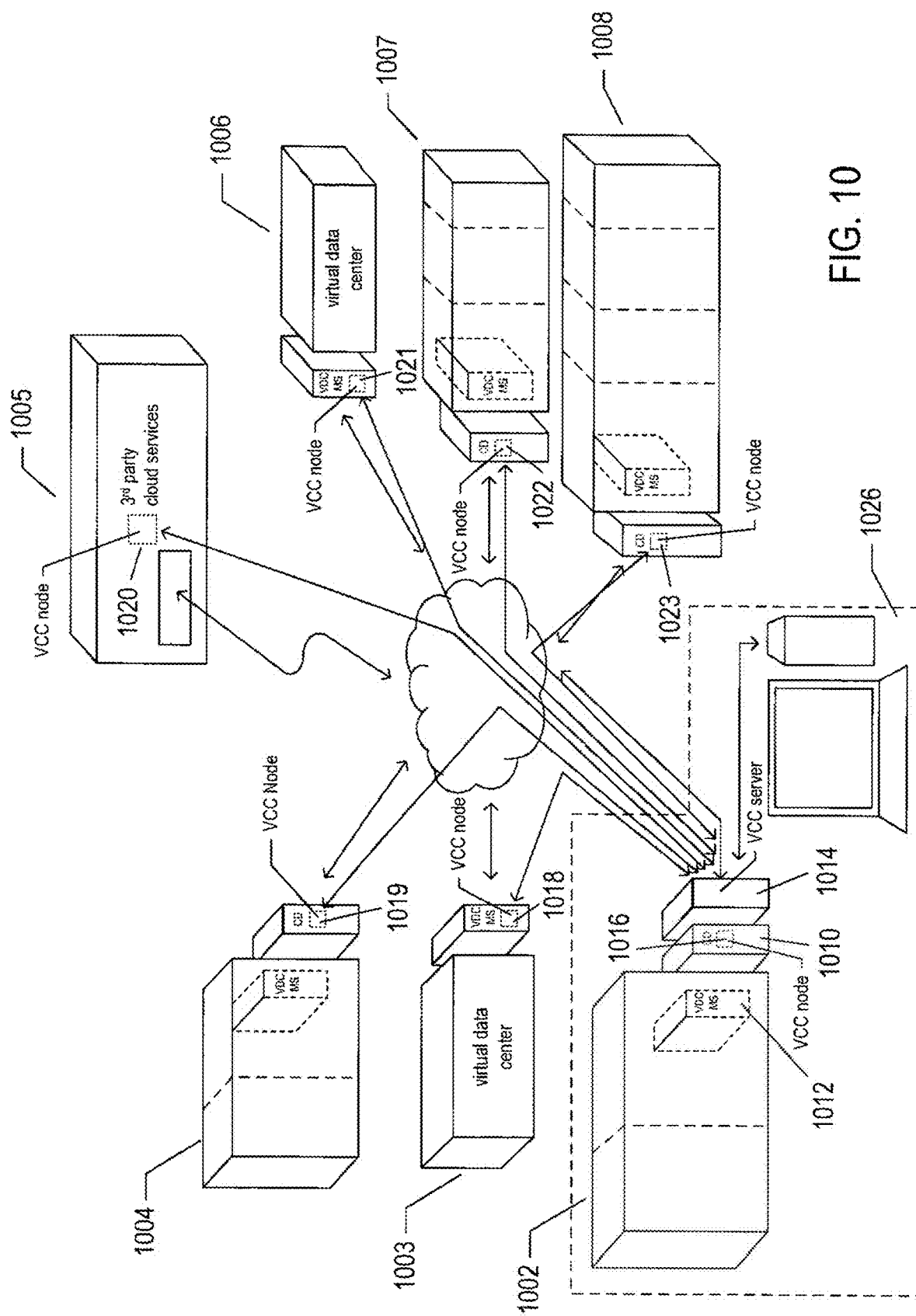
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Distributed Service-Oriented Applications

Figure 11:
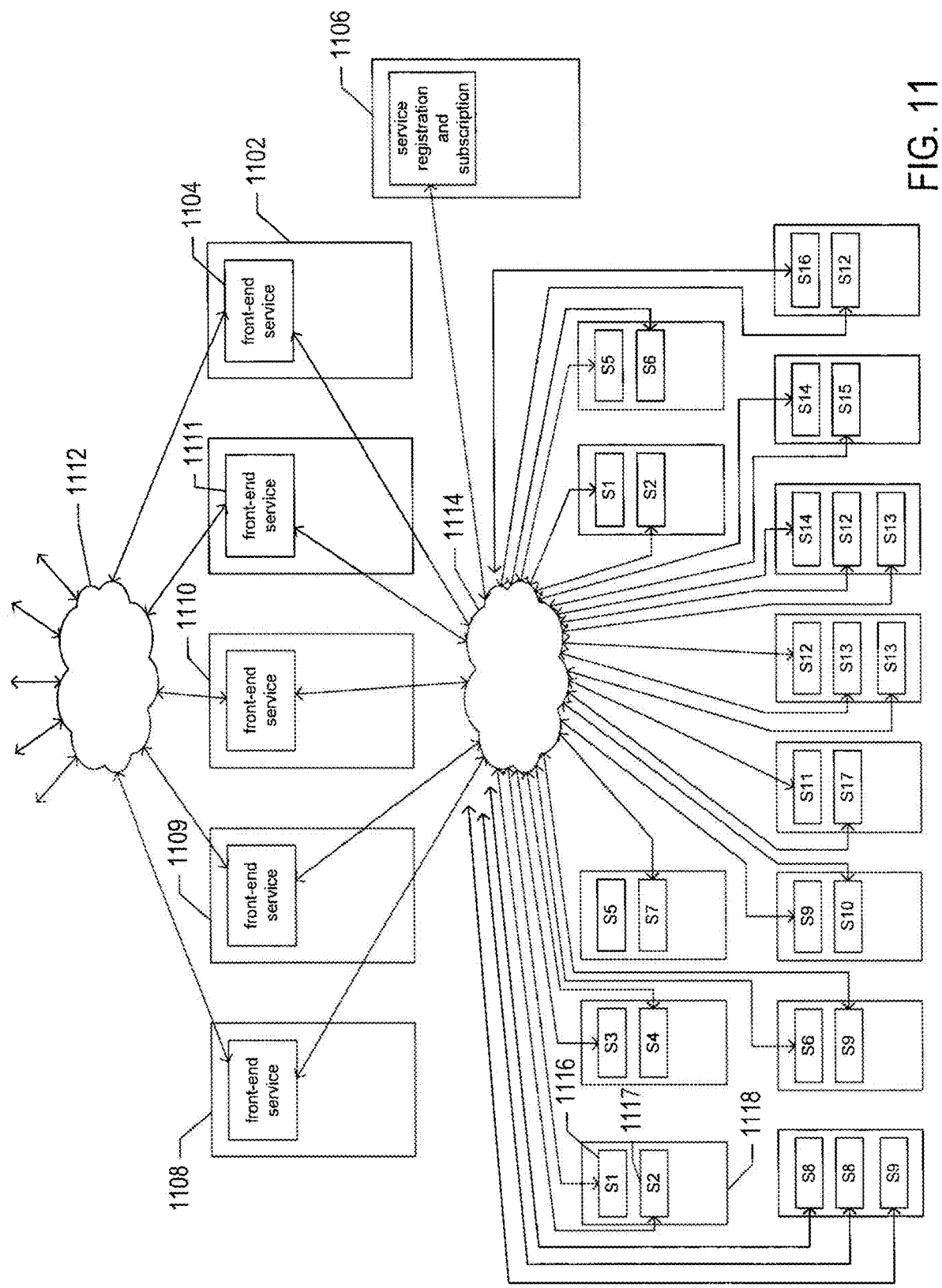
FIG. 11 illustrates a distributed service-oriented application.

FIG. 11 illustrates a distributed service-oriented application. In FIG. 11, a number of servers, such as server 1102, are shown within a distributed computer system. The servers run various different services, such as front-end service 1104. Services are executables that provide functionality to other computational entities through a service interface, such as a RESTful application programming interface ("API") accessed through network communications using REST-protocol requests, although other communications protocols and application programming interfaces can be used. A distributed service-oriented application can be considered to be a collection of various different services, referred to as "service instances," that cooperate to implement a distributed application. The services are each implemented by one or more service instantiations, or service executables, that run within servers, or within virtual machines executing within servers, of one or more distributed computer systems. Various different types of implementations are possible. The service instances of the distributed application are often registered with a registration-and-subscription service 1106 to which other services can subscribe in order to receive updates with regard to the addition, removal, and changes to the array of available service instances. In the example distributed service-oriented application illustrated in FIG. 11, a set of front-end-service instantiations 1104 and 1108-1111 communicate with remote clients and users through the Internet 1112 and communicate, via local-area networks and wide-area networks within the distributed computer system, with the many different service instantiations within the distributed computer system that together comprise the distributed service-oriented application, such as service instantiations 1116 and 1117 running within server 1118. In a traditional distributed service-oriented application, both communications between the front-end service instances and external clients and users as well as internal communications between service instances employ the REST protocol or other similar stateless protocols.

Figure 12:
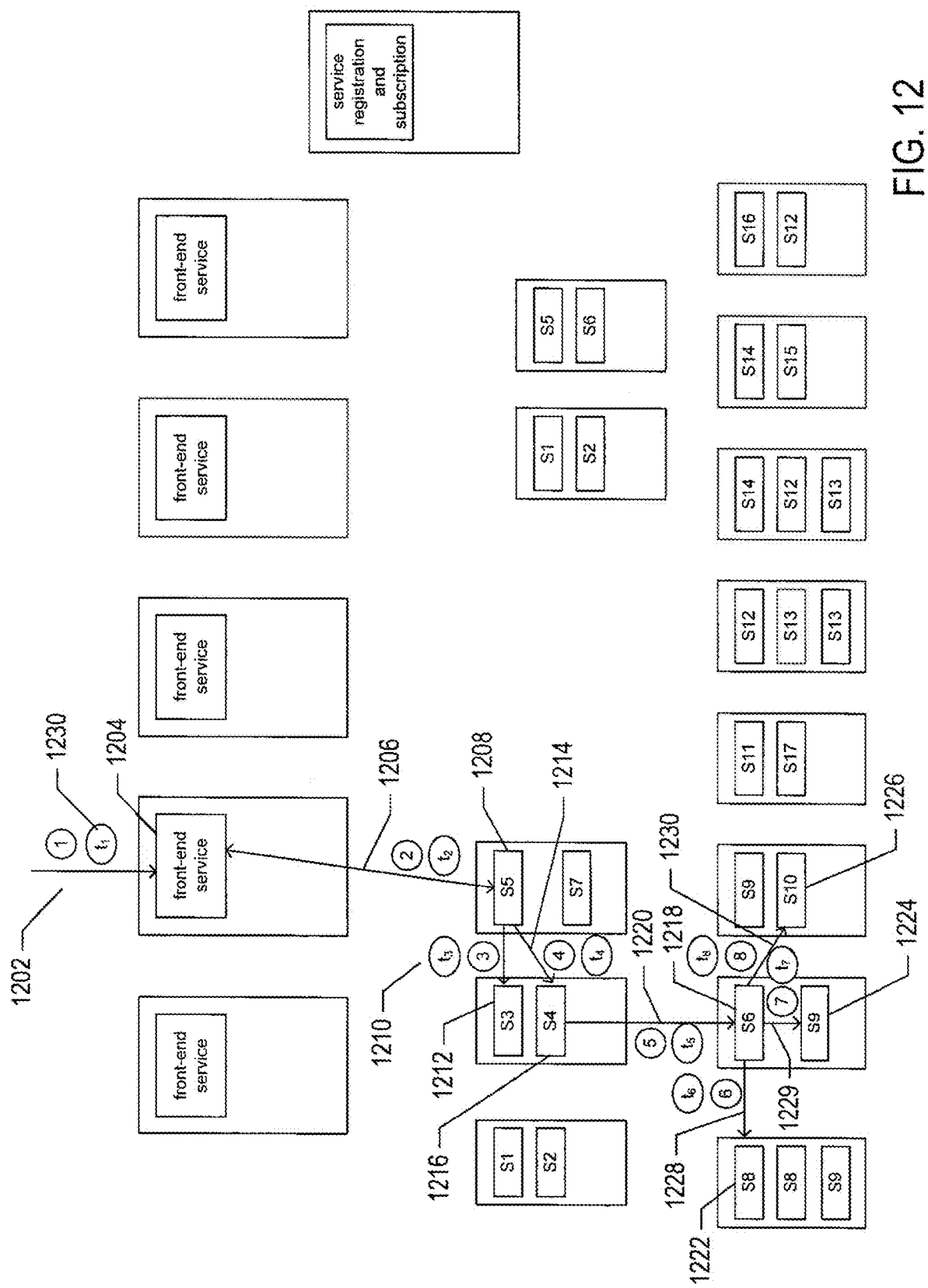
FIG. 12 illustrates a sequence of service calls that implement a particular distributed-service-oriented-application API call or entry point.

FIG. 12 illustrates a sequence of service calls that implement a particular distributed-service-oriented-application API call or entry point. In a first step 1202, a remote user or client sends a request to the distributed service-oriented application, resulting in a call to one of the front-end-service instances 1204. The front-end-service instance, in a second step 1206, calls a service instance 1208 in order to launch execution of the distributed-service-oriented-application request-handling machinery for the received request. In FIG. 12A, the service instances are referred to by alphanumeric labels, such as the label "S5" for service instance 1208. In a third step 1210, service instance S5 calls service instance S3 1212. In a fourth step 1214, service instance S5 calls service instance S4 1216 which, in turn, calls service instance S6 1218 in a fifth step 1220. Component-service instance S6 then calls the additional service instances S8 1222, S9 1224, and S10 1226 in steps 1228 1229 and 1230, respectively. Each of the various service instances carry out certain tasks and functionalities that contribute to execution of the user or client request. For example, service instance S5 1208 may receive and queue the request, call service instance S3 1212 to authenticate and authorize the request, and then call service instance S4 1216 to parse the request and to carry out the requested tasks. Component-service instance S6 1218 may handle a particular type of task or set of tasks, and may call data-storage-and-retrieval service instance S8 1222, a data-analysis service instance S9 1224, and a linear-algebra-computation service instance S10 1226, as one example.

The philosophy underlying distributed service-oriented applications is, in some ways, similar to the philosophy underlying modular programming and object-oriented programming. A distributed-service-oriented-application developer can assemble a distributed application from multiple different, relatively independent, and loosely coupled services without being concerned about the implementations of any but the services specific to the service-oriented distributed application that is being developed, just as library functions and the modules can be called from a modern structured program in order to access the functionalities provided by the library functions and modules without a requirement to understand the implementations of the library functions and modules. Because stateless communication protocols are employed, many of the complexities associated with connection-oriented communications are avoided. As in object-oriented programming, services are reusable, and a useful service may be concurrently or simultaneously accessed by multiple different distributed service-oriented applications. Services can be implemented by concentrating on local considerations and constraints, without worrying about global considerations and the constraints associated with a distributed application, in its entirety. It is these and other such advantages that have propelled distributed service-oriented applications into the forefront of application development.

However, in addition to the many advantages, disadvantages associated with distributed service-oriented applications have become apparent. As can be seen in FIGS. 11 and 12, the pattern of internal service calls within a traditional service-oriented distributed application tends to be hierarchical. In many cases, particular service instances persistently store data in caches and data-storage appliances collocated with the service instance in particular computational environments. Service instances may therefore be constrained with respect to relocation to different computational environments. Additional relocation-related constraints may involve the fact that a given service often depends on external services, so that a given service instance may only be relocatable to a different computational environment that satisfies external-services dependencies. The different service instances of a service-oriented distributed application may not scale proportionately to one another, so that the number of service instances of a particular overloaded, resource-bound service may not be independently expandable, but may be expandable only on the condition that the numbers of service instances of other, dependent services are also expanded. In the case that one or more of the dependent services are third-party services, such dependencies can represent significant constraints on service-instance relocation. Additional constraints with respect to persistent-data-store collocation may add a great deal of additional complexity to the scaling operation. Additional problems are associated with communications interconnections between internal services. A given service, for example, may provide an interface accessed both by external users and clients of the distributed service-oriented application as well as by service instances of one or more distributed service-oriented applications. Changes to the interfaces of one or more services may require changes to the services that access them, and these changes may percolate further through the service-instance hierarchy. Internal to each service instance, the components of an application are coupled both to other components within the same instance and to the specifications of the compute, network and storage resources granted to that instance. While scaling is possible for currently available distributed service-oriented applications, scaling operations are generally constrained to scale large portions of the service-instance hierarchy due to rigid hierarchical constraints, including service instances that are not being used close to their capacities or bandwidths. This results in wasted computational-resource allocation. For these and additional reasons, there remain many problems and challenges with respect to development of traditional distributed service-oriented applications.

Currently Disclosed Methods and Systems

Figure 13A:
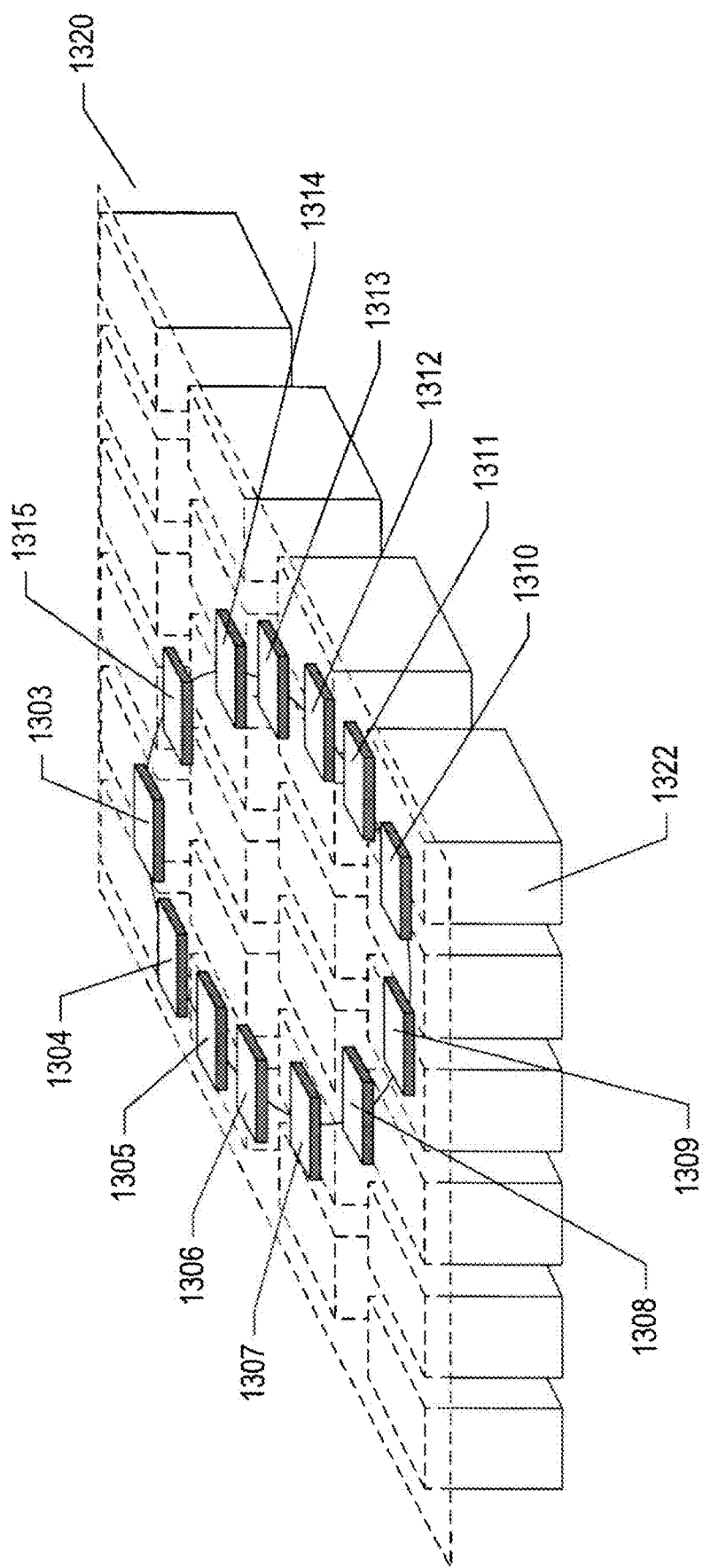
FIGS. 13A-C provide a high-level illustration of the currently disclosed REST-actor-data-grid-based ("RAD^2") architecture for RAD^2 applications.
Figure 13B:
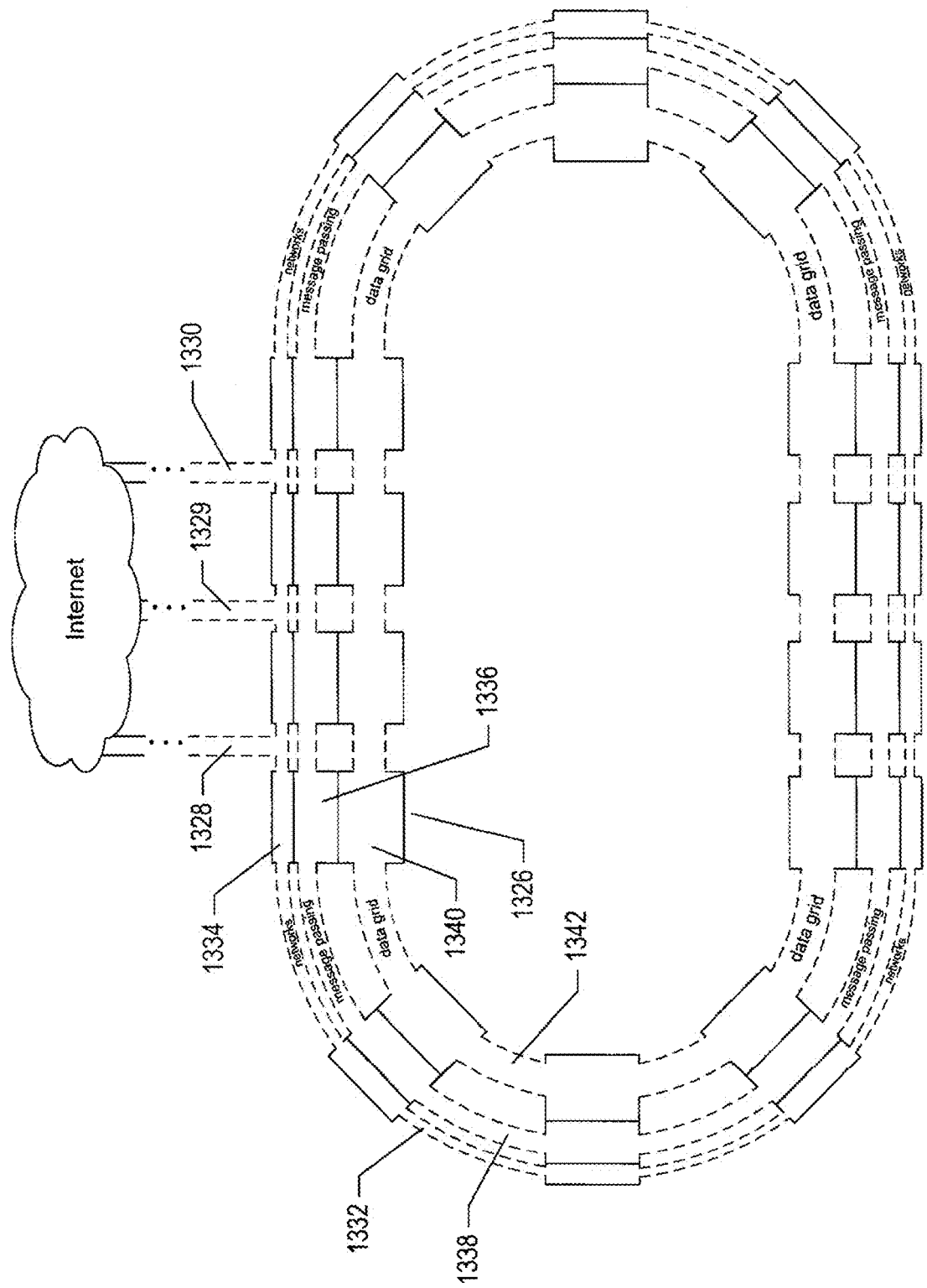
Figure 13C:
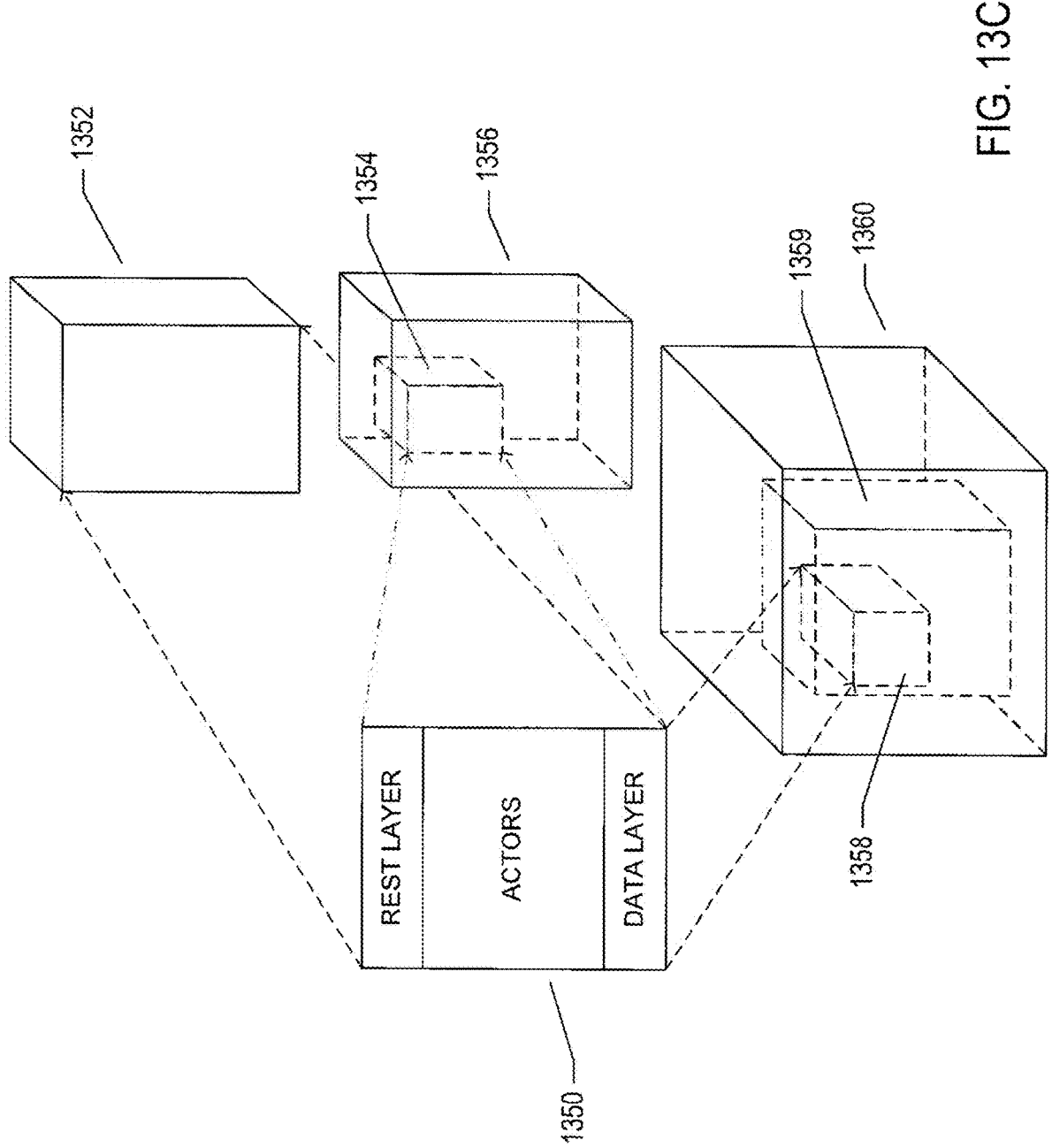

FIGS. 13A-C provide a high-level illustration of the currently disclosed REST-actor-data-grid-based ("RAD^2") architecture for RAD^2 applications. It should be understood, at the onset, that while REST is often chosen for the stateless communication protocol by which users and clients access a RAD^2 application, other stateless communication protocols may be alternatively employed. As shown in FIG. 13A, a RAD^2 application consists of a set of communications-interconnected RAD^2-application nodes 1303-1315. The RAD^2 application is implemented above the computational infrastructure of a distributed computer system 1320, represented in FIG. 13A as a large collection of server computer systems, such as computer system 1322. As discussed in preceding sections of this document, distributed computer systems tend to be large, complex systems that may be geographically distributed and that contain tens, hundreds, thousands, or more discrete computer systems, data-storage appliances, networks, power supplies, and many other, additional components. A RAD^2 application is thus a large and complex set of physical computing components and many different control components comprising stored computer instructions that are executed by processors within the physical computing components.

FIG. 13B illustrates the RAD^2 application in greater detail. In FIG. 13B, each RAD^2-application node is represented by a rectangle, such as RAD^2-application node 1326. The RAD^2-application nodes are interconnected with one another and to external clients and users of the RAD^2 application through internal virtual and physical networks of the distributed computer system as well as various types of external local-area and wide-area networks, including the Internet. This set of networks is represented, in FIG. 13B, by channels 1328-1330, which represent communication links between internal virtual and physical networks of the distributed computer system and the Internet, and by continuous outer channel 1332, which represents virtual and/or physical networks within the distributed computer system that link the RAD^2-application nodes to one another. The portions of the RAD^2-application nodes through which this outer channel passes, such as portion 1334 of RAD^2-application node 1326, are referred to as the "REST layers" of the RAD^2-application nodes. In a prototype implementation, the VMware Spring Boot product was used to implement the REST layers of the RAD^2-application nodes.

The middle portions of the RAD^2-application nodes, such as the middle portion 1336 of RAD^2-application node 1326, are linked together by a message-passing channel 1338. The middle portions of the RAD^2-application nodes are referred to as "actor layers." Each actor layer of a RAD^2-application node supports execution of multiple actors. Actors, as further discussed below, carry out the bulk of the computational tasks involved in responding to requests input to the distributed service-oriented application by external clients and users. The actors running in the RAD^2-application nodes of the RAD^2 application communicate with one another by message passing. Message passing is, of course, also based, in part, on networking, but is a distinct logical communications layer separate from the networking layer represented by the outer channel 1332. In a prototype implementation, the Akka Actor Model was used to implement the actor layers of the RAD^2-application nodes.

A final portion of each RAD^2-application node, such as portion 1340 of RAD^2-application node 1326, are linked together by a distributed data grid, represented by inner channel 1342. These final portions of the RAD^2-application nodes are referred to as the "data-grid layers" of the RAD^2-application nodes. The distributed data grid is a distributed data-storage facility that can be accessed by each RAD^2-application node and by each actor running within each RAD^2-application node. The distributed data grid consists of a third logical communications layer that is based on virtual and physical networking as well as on physical data-storage devices and appliances and on physical memories. In a prototype implementation, the Apache Ignite® product was used to implement the data-grid layers of the RAD^2-application nodes.

Each RAD^2-application node is thus accessible by external clients and users of the distributed service-oriented application, and a client request received by any RAD^2-application node can be either directed by the REST layer of the RAD^2-application node to another of the RAD^2-application nodes through the outer networking channel 1332 or processed locally within the receiving RAD^2-application node. The actor-level implementation of the RAD^2-application functionality is isolated from the REST-protocol-based external interface of the RAD^2 application, which addresses the above-mentioned problem of hierarchical REST-interface dependencies among services of a distributed service-oriented application. For local processing of a client request, the REST layer of the RAD^2-application node sends a corresponding message to one of the actors within the RAD^2-application node. The receiving actor then processes the request or communicates, via message passing, with multiple additional actors via the message-passing channel 1338 in order to carry out the computational tasks needed to respond to the client or user request. An actor can send messages to any other actor, regardless of the RAD^2-application node in which the other actor is currently executing. Each actor can read data from, and write data to, the distributed data grid in order to retrieve and persistently store data. Because an actor can access the data grid and communicate with all other actors regardless of the RAD^2-application node in which the actor is currently executing, and because any actor is accessible, at least indirectly, from the REST layer of any RAD^2-application node, an actor is not constrained with respect to the particular RAD^2-application node that hosts the actor. An actor can therefore be freely relocated among RAD^2-application nodes. Unconstrained distribution and redistribution of actors across the RAD^2-application nodes addresses the execution-location dependencies and constraints inherent in traditional distributed-service-oriented-application architectures. RAD^2-application nodes can be easily added to, or removed from, the RAD^2 application. The actors executing within a RAD^2-application node can be easily relocated to other of the RAD^2-application nodes prior to removal of the RAD^2-application node, and actors executing within current RAD^2-application nodes can be easily relocated to a newly added RAD^2-application node. RAD^2 applications can therefore be more efficiently scaled, either upwards, to handle increased workloads, or downwards, to conserve computational-resource use when workloads decrease, than traditional distributed service-oriented applications.

As shown in FIG. 13C, RAD^2-application nodes, such as RAD^2-application node 1350, can be implemented by any of many different computational environments provided within a distributed computer system. They may be implemented by individual discrete computer systems, or servers, such as discrete computer system 1352, they may be implemented by virtual machines, such as a virtual machine 1354 provided within computer system 1356, and they may be implemented by finer grained execution environments, such as execution environment 1358, provided within virtual machine 1359 of computer system 1360. In addition, RAD^2-application nodes can be implemented by aggregations of discrete computer systems, virtual machines, or finer-grained execution environments.

Figure 14:
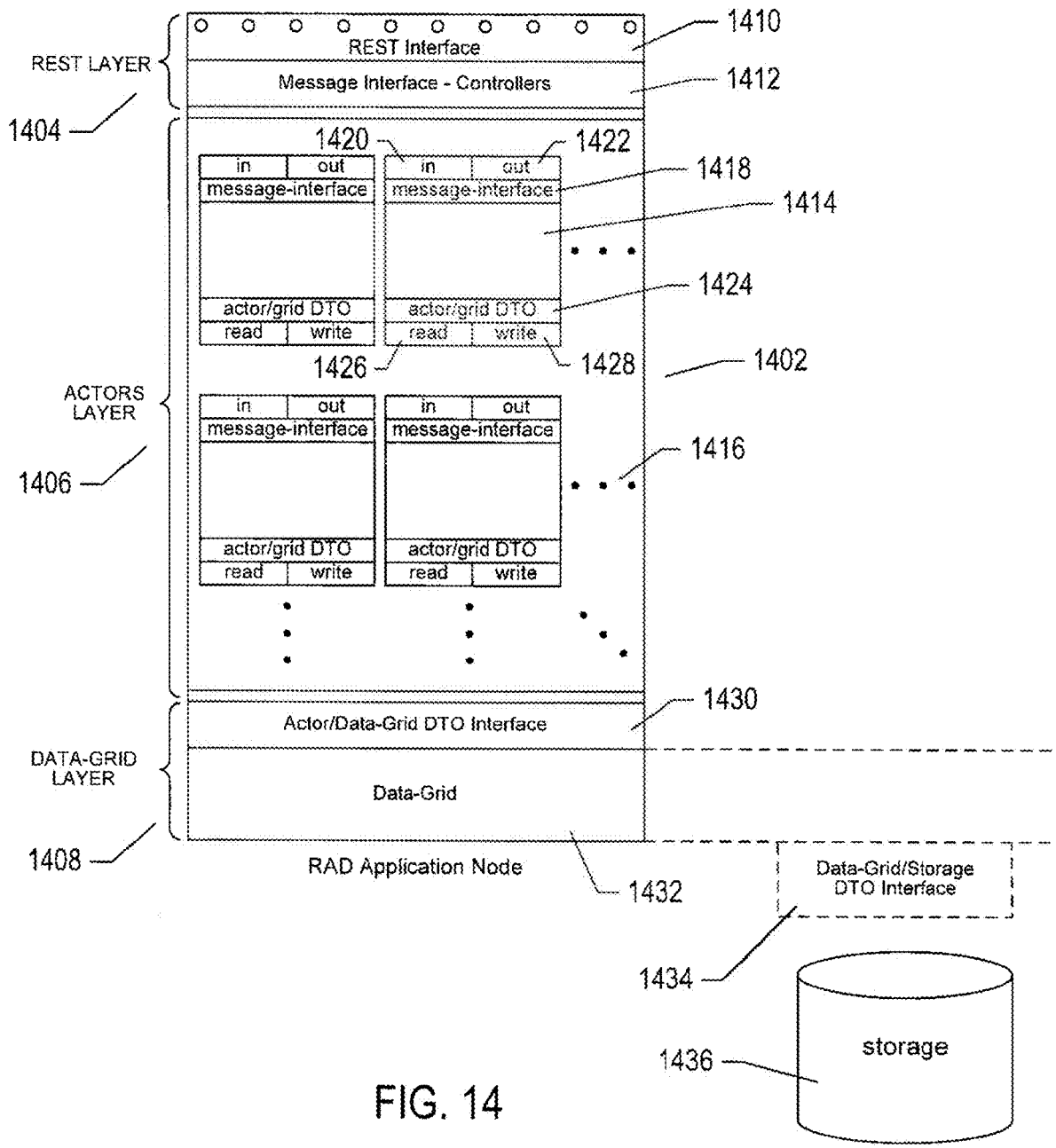
FIG. 14 illustrates a RAD^2-application node in greater detail.

FIG. 14 illustrates a RAD^2-application node in greater detail. As discussed above, an RAD^2-application node 1402 includes a REST layer 1404, an actors layer 1406, and a data-grid layer 1408. The REST layer 1404 includes a set of REST endpoints 1410 and a message-passing interface 1412 comprising one or more controllers. The REST endpoints correspond to uniform resource identifiers ("URIs") that represent logical resources or services provided by the RAD^2 application via the REST communications protocol. Several protocol-defined types of requests can be received by a REST endpoint. Data included in a request can further define the request types. The controllers, as further discussed below, receive REST requests directed to the REST endpoints and either forward a received request to an external RAD^2-application node for remote processing of the request or send a corresponding message to an actor executing within the RAD^2-application node to launch local processing of the request. The actors layer 1406 provides execution environments for multiple actors, including actor 1414 as well as an interface to the message-passing communications layer that allows the actors to send messages to one another, to receive messages from the controllers in the REST layer, and to send messages to the controllers in the REST layer. The ellipses in FIG. 14, such as ellipsis 1416, indicate that execution of many additional actors may be supported within the actors layer of a RAD^2-application node. Each actor includes a message-passing interface 1418 through which the actor receives messages 1420 and sends messages 1422. The actor also includes a data-grid interface 1424 through which the actor reads data from the data grid 1426 and stores data persistently within the data grid 1428. Data passes to the data grid and is received from the data grid in the form of data-transfer objects ("DTOs"). The data-grid layer 1408 of an RAD^2-application node includes a DTO-transfer interface between the actors and the data-grid layer 1430 as well as an interface to the distributed data grid 1432. The distributed data grid additionally interfaces 1434 to various types of data-storage appliances 1436 and may additionally include internal interfaces to memory caches and other data-storage facilities within the distributed computer system.

Figure 15:
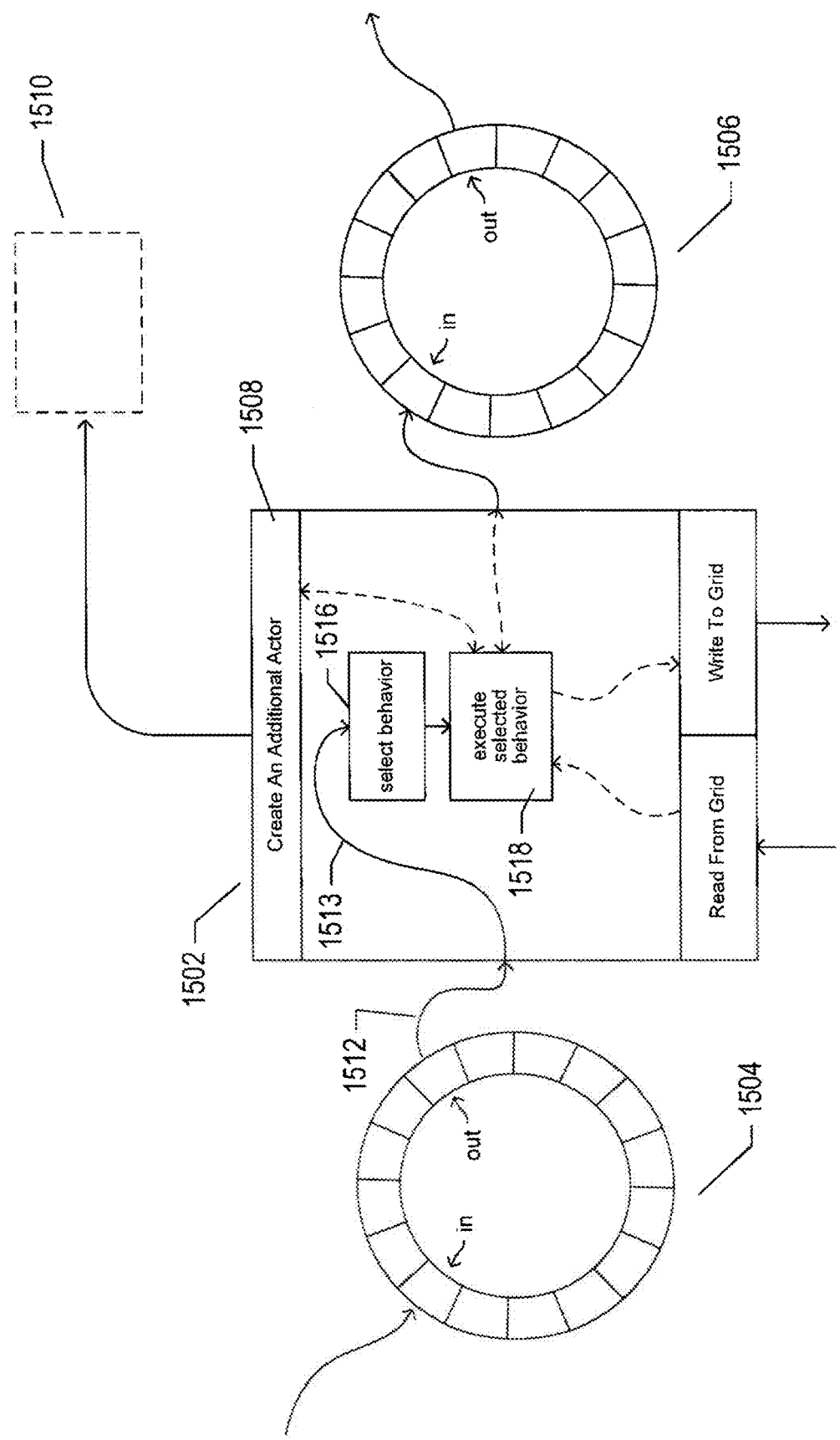
FIG. 15 illustrates basic operations of an actor.

FIG. 15 illustrates basic operations of an actor. Each actor is associated with a message mailbox. In FIG. 15, the mailbox associated with actor 1502 is shown as an incoming-message mailbox 1504 and an outgoing mailbox 1506, both mailboxes represented by circular queues. Each actor interfaces to an actor-creation interface 1508 that allows the actor to create one or more additional actors 1510. Thus, a set of actors, or actor cluster, that carry out the computational tasks corresponding to a particular REST endpoint can be instantiated by an initial primary actor. Each actor processes only one message at a time. For a next message received from the incoming mailbox, as represented by arrows 1512 and 1513, an actor selects a particular behavior 1516, or executable logic, to process the received message. The actor then executes the selected behavior 1518, which may involve creating one or more additional actors, generating and transmitting, to the outgoing mailbox 1506, one or more new messages, reading data from the distributed data grid, and writing data to the distributed data grid. Actors carry out the computational tasks associated with responding to received REST requests, and do so relatively independently from the activities of other actors in the RAD^2 application and independently from the ongoing communications traffic being handled by RAD^2-application nodes, including the RAD^2-application node in which the actors execute.

Figure 16A:
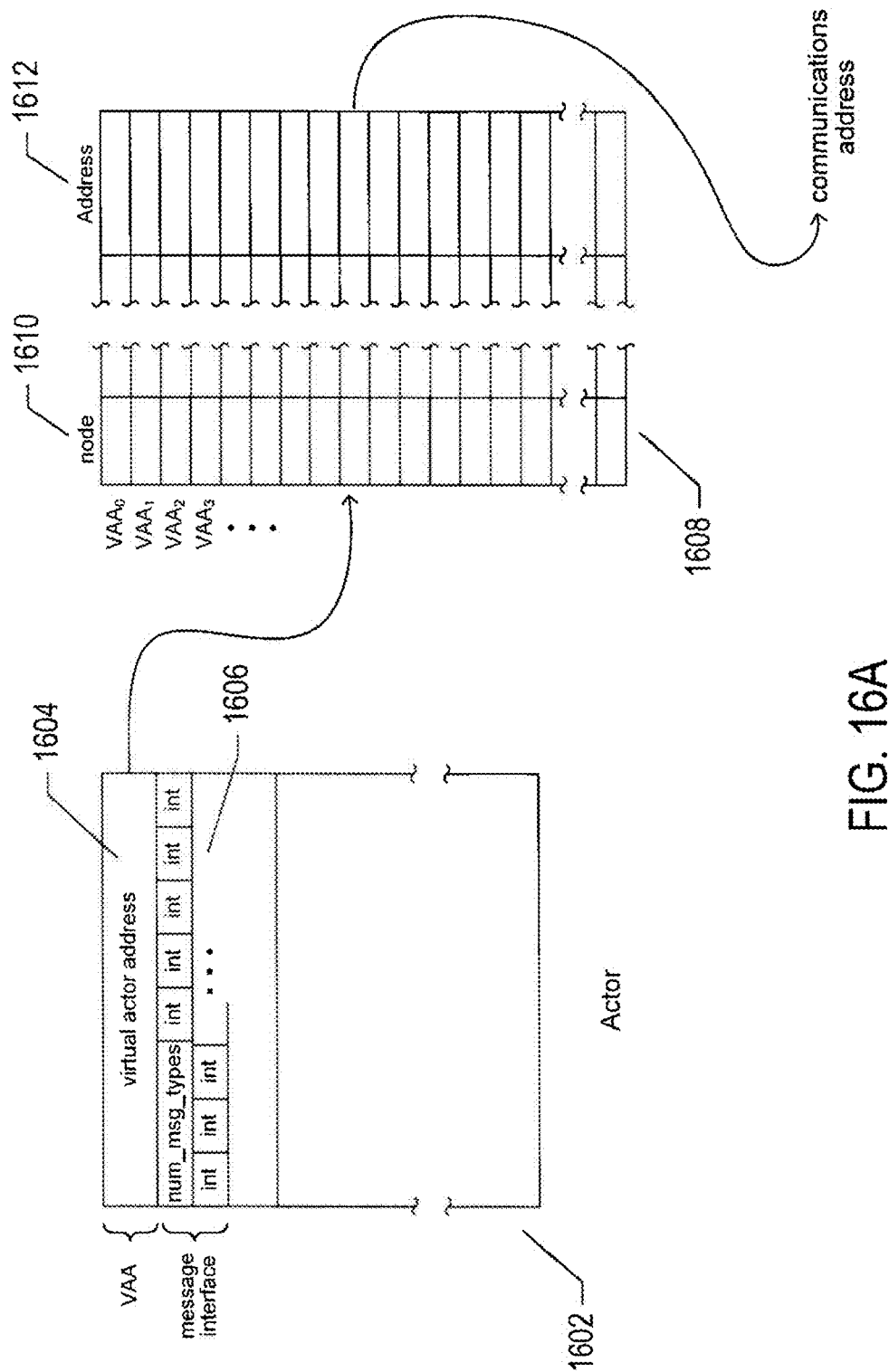
FIGS. 16A-B illustrates logical data structures that represent the roles of message types and virtual actor addresses in a RAD^2 application.
Figure 16B:
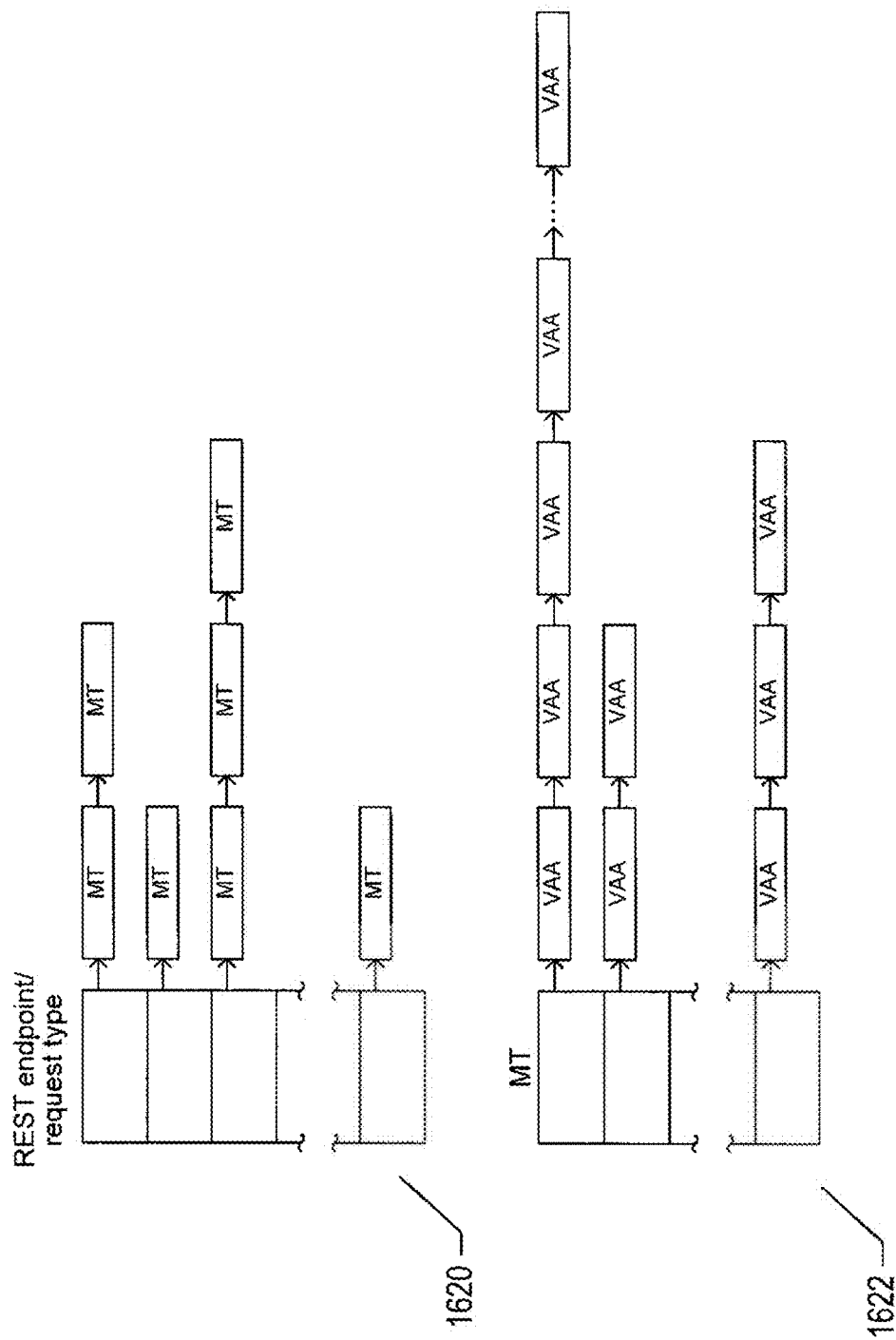

FIGS. 16A-B illustrates logical data structures that represent the roles of message types and virtual actor addresses in a RAD^2 application. As shown in FIG. 16A, each actor 1602 is associated with a virtual actor address 1604 that is unique among all actors within a RAD^2 application. In addition, each actor indicates, through a message interface, a set of message types 1606 that the actor can receive and process. Logically, a virtual actor address acts as an index into a mapping table 1608 that maps each virtual actor address to a RAD^2-application node 1610, a communications address 1612 which may include, as one example, an Internet protocol ("IP") address and a port number, and additional information that constitutes a local message-passing address within the RAD^2-application node. Thus, a message addressed to a virtual actor address and output by an actor to the outgoing mailbox is mapped to the networking address and/or additional addresses needed to transmit the message to an actor in a different RAD^2-application node and to the actor within the local RAD^2-application node. As shown in FIG. 16B, another logical data structure 1620 maps each REST-endpoint/request-type pair to one or more message types. A third logical data structure 1622 maps each message type to a set of virtual actor addresses associated with currently executing actors that can receive and process messages of that type. Thus, controllers within the REST layer of a RAD^2-application node can determine a virtual actor address for a virtual actor that can process any client or user request received by any REST endpoint. In certain cases, various types of workload-balancing logic can be applied at the controller level, including ordering the sequence of virtual actor addresses mapped to particular message types and distributing messages of each type to virtual actor addresses in proportion to sequence orders of the virtual actor addresses mapped to the type or according to other distribution policies. However, as discussed further below, redistribution of actors among RAD^2-application nodes provides another important dimension to workload balancing.

Figure 17:
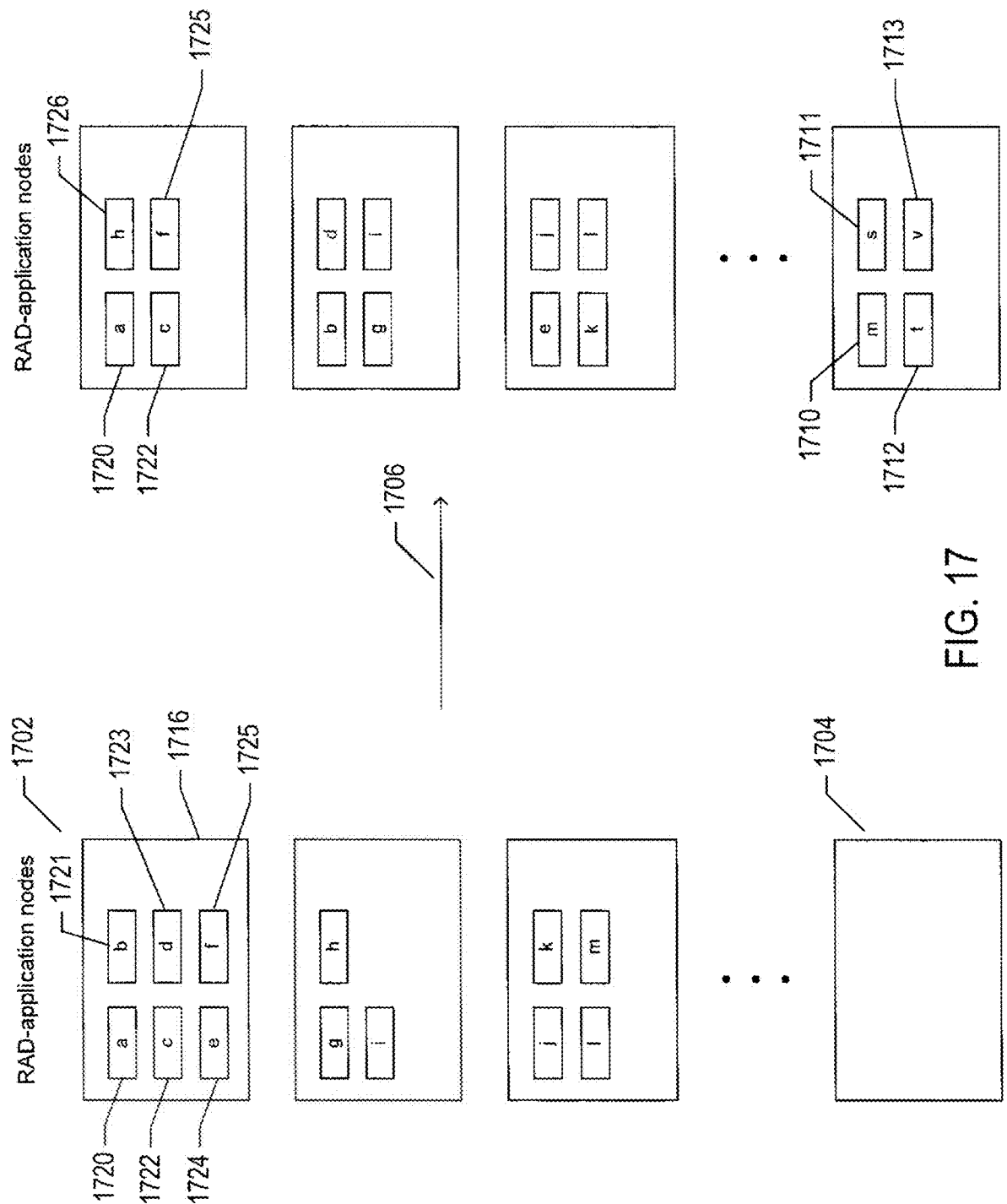
FIG. 17 indicates a motivation for workload-balancing.

FIG. 17 indicates a motivation for workload-balancing. In a first column 1702 in FIG. 17, a number of RAD^2-application nodes are represented by large rectangles. Smaller rectangles inside each of the larger rectangles represent actors currently executing in the RAD^2-application nodes represented by the larger rectangles. The distribution of actors among the RAD^2-application nodes in column 1702 is unbalanced, since at least one of the RAD^2-application nodes 1704 does not contain any currently executing actors. A workload-balancing operation, represented by horizontal arrow 1706, seeks to redistribute actors among RAD^2-application nodes to distribute, as evenly as possible, the cumulative workload represented by execution of the actors among the RAD^2-application nodes. Following the rebalancing operation illustrated in FIG. 17, for example, the RAD^2-application node represented by rectangle 1704 transitions from initially containing no actors to containing the four actors 1710-1713. In addition, the RAD^2-application node represented by rectangle 1760 transitions from containing six executing actors 1720-1725 to containing only four executing actors 1720, 1722, 1725, and 1726. Workload balancing is generally carried out periodically, during the lifetime of a RAD^2 application, in order to maintain a fair workload distribution among the RAD^2-application nodes despite dynamic fluctuations of workloads and dynamic fluctuations of currently executing actors. Workload balancing is also carried out during scaling operations in which the number of RAD^2-application nodes is either increased, to respond to an increase in total workload, or decreased, to respond to a decrease in total workload. As mentioned in the preceding paragraph, a certain amount of workload-balancing can be effected at the controller level by various message-distribution policies that together promote balanced RAD^2-application-node workloads. However, another, often more effective and simpler workload-balancing method involves redistributing actors among RAD^2-application nodes. An actor is easily relocated from a first RAD^2-application node to a second RAD^2-application node, in distributed applications built according to the RAD^2 architecture, by instantiating the actor in the second RAD^2 architecture, since the actor equally accessible to other RAD^2 in each RAD^2-application node and since the data grid is equally accessible to the actor in each RAD^2-application node. Unlike in currently available distributed service-oriented applications, there are no significant constraints associated with changing the RAD^2-application node location of an actor. Different workload-balancing methods can be used together.

There are many considerations involved in determining whether a distribution of actors among RAD^2-application nodes is balanced or unbalanced. Considerations include the number of executing actors in each of the RAD^2-application nodes as well as the fraction of the total cumulative workload that is handled by each of the actors. In addition to the many different considerations that may be involved in workload-balancing, there are also many different types of metrics and the monitoring data that can be collected in order to facilitate workload-balancing and many different techniques and approaches to using that information to carry out effective workload-balancing. Workload balancing, however, is associated with significant computational overheads, and so the accuracy, or evenness, of workload balancing achieved by workload-balancing operations must be weighed against the computational overheads required to achieve those levels of accuracy or evenness. An optimal loan-balancing technique may, for example, produce a somewhat less even distribution of workloads than more complex techniques, but may do so at a much lower computational cost than the more complex techniques.

Figure 18A:
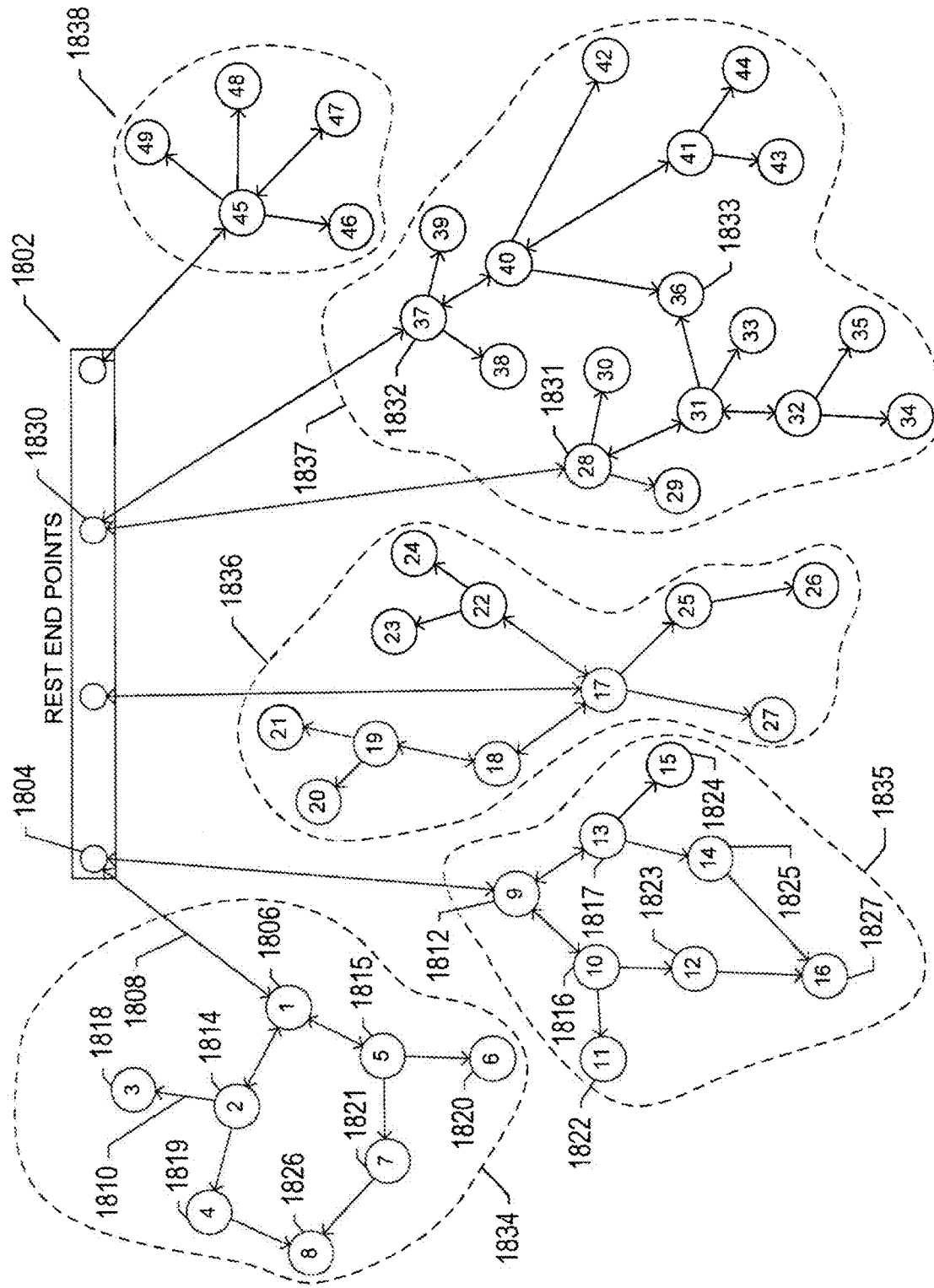
FIGS. 18A-C illustrate a workload-balancing example.
Figure 18B:
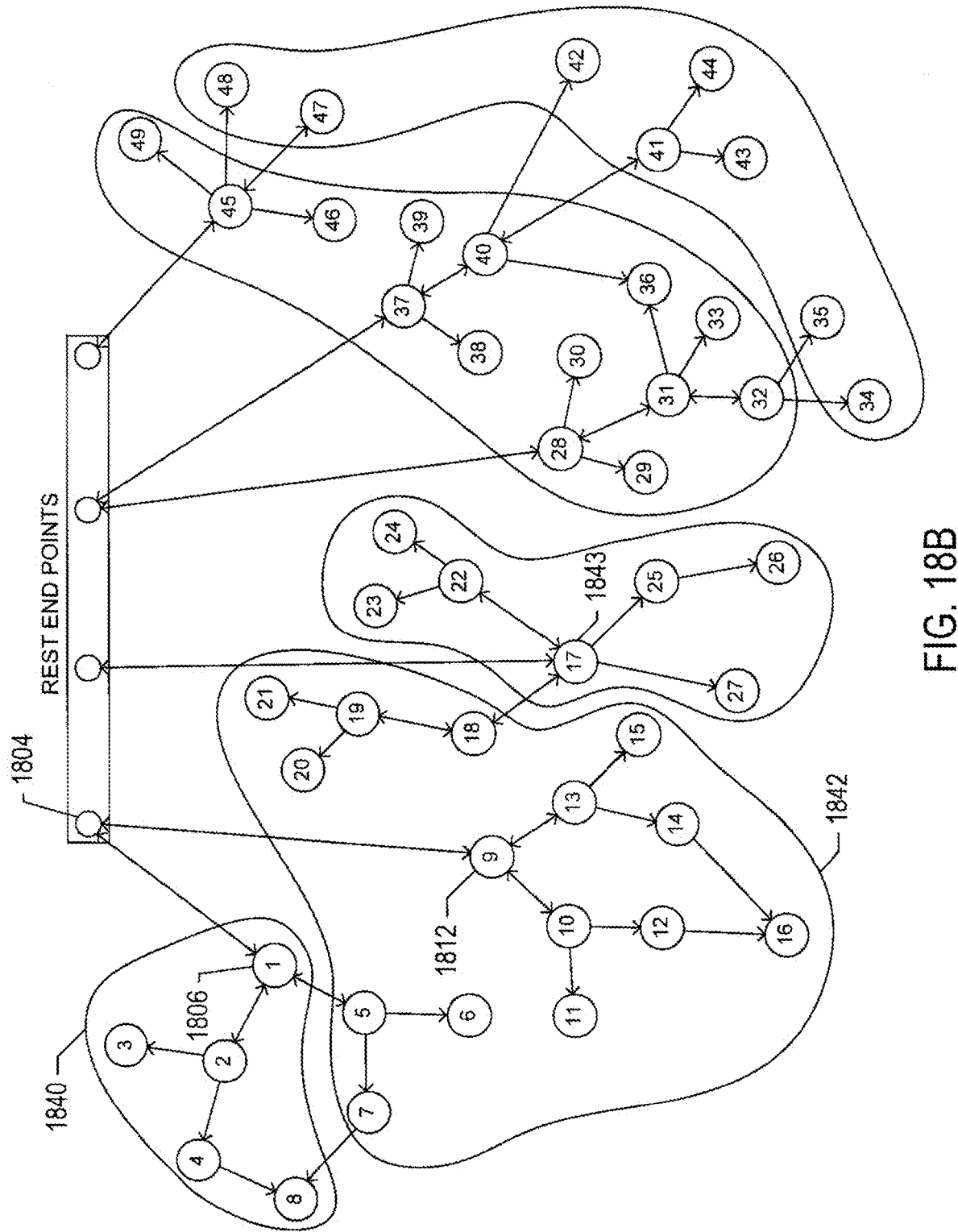
Figure 18C:
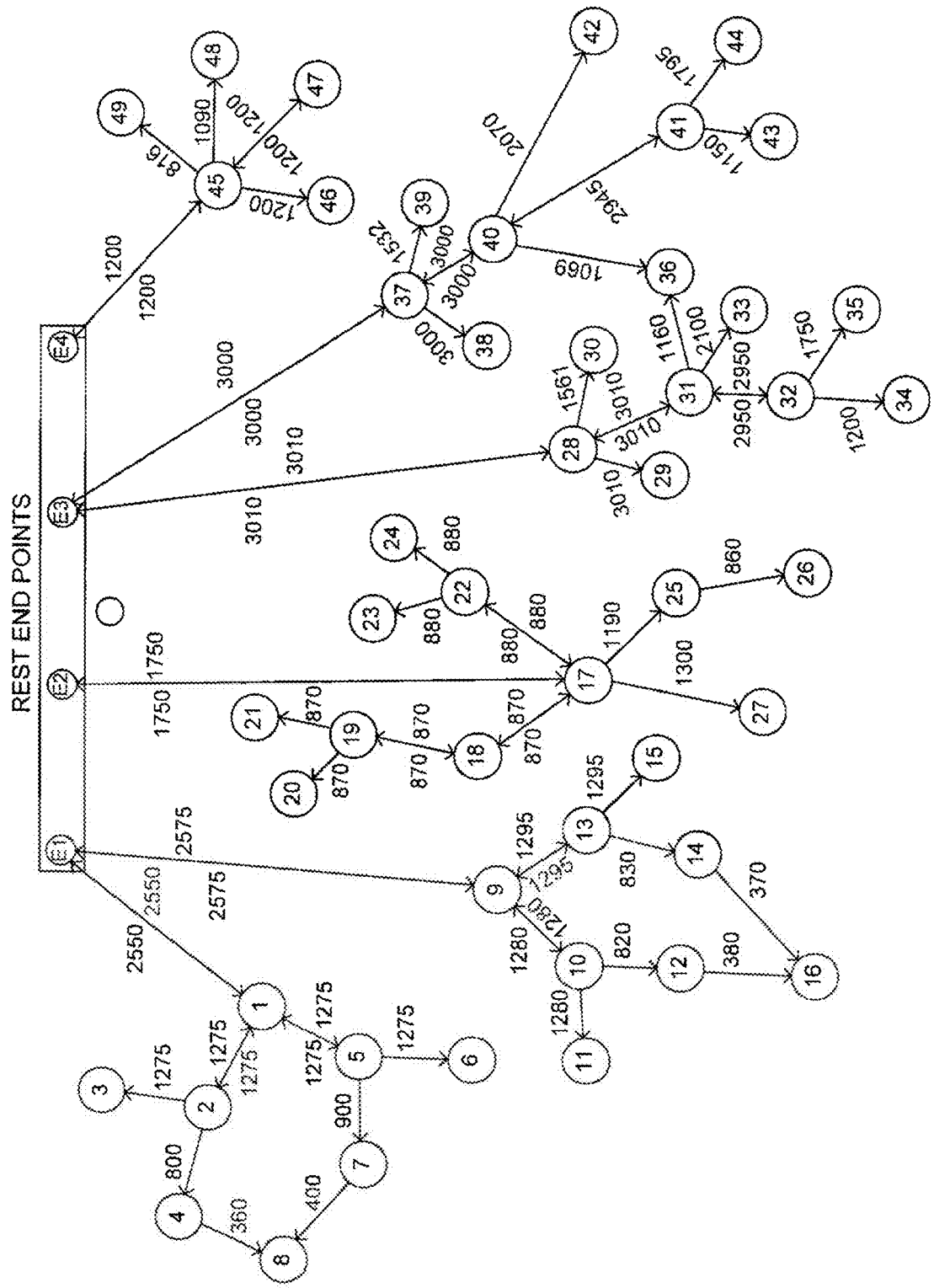

FIGS. 18A-C illustrate a workload-balancing example. The illustration conventions introduced in FIG. 18A are later employed in FIGS. 23A-C. In FIG. 18A, a set of four REST endpoints 1802 are shown at the top of the figure. Each REST endpoint is represented by a circle, such as circle 1804. Actors are represented by larger circles, such as circle 1806. Message passing between REST endpoints and actors and between pairs of actors is represented by directed line segments. A double-headed arrow, such as double-headed arrow 1808, represents passing of messages in both directions while a single-headed arrow, such as single-headed arrow 1810, represents message passing in a single direction, only. In the example of FIG. 18A, a request received at REST endpoint 1804 results in a corresponding message sent to either actor 1806 or to actor 1812. Actors 1806 and 1812 are thus both primary actors for a particular type of REST request. The primary actors, in turn, may exchange messages with secondary actors 1814-1815 and 1816-1870. These secondary actors may exchange messages with tertiary actors 1818-1819, 1820-1821 1822-1823 and 1824-1825. Finally, tertiary actors 1819 and 1821 may send messages to actor 1826 and tertiary actors 1823 and 1825 may send messages to actor 1827. The actors that indirectly receive messages from actor 1806, including actors 1814-1815, 1818-1821, and 1826, together with actor 1806, comprise a cluster of actors that cooperate to process REST requests received by REST endpoint 1804. This actor cluster is encircled with dashed curve 1834. Dashed curves 1835-1838 encircle four additional actor clusters. The large set of actors which receive messages resulting from REST requests arriving at REST endpoint 1830, beginning with primary actors 1831 and 1832, form a single cluster 1837 since message paths emanating from both of these primary actors include actor 1833. Clusters can be determined by any of many different well-known node-cluster-determination methods that are applied to graphs, such as the graph shown in FIG. 18A. One method assigns each graph node to its own cluster and then iteratively merges pairs of edge-connected clusters.

The circles representing actors each include a numeric name, or label, for the actors. These labels are used in workload-distribution data, shown in FIG. 22 and discussed below.

FIG. 18B illustrates a current, very unbalanced distribution of the actors in the example of FIG. 18A across five RAD^2-application nodes. Each RAD^2-application node is represented by an enclosed curve, such as enclosed curve 1840, indicating the actors currently executing in the RAD^2-application node. All but one of the actor clusters that each includes clusters that cooperate to process particular types of requests are distributed across multiple RAD^2-application nodes. Furthermore, the numbers of actors executing in each of the five different RAD^2-application nodes are quite unbalanced, with one RAD^2-application node, represented by curved 1840, currently hosting only five actors while the RAD^2-application node represented by curve 1842 is currently hosting 15 actors. While the number of actors executing in a RAD^2-application node may not be directly proportional to the cumulative workload handled by the RAD^2-application node, the actors executing in the RAD^2-application node corresponding to curve 1842 include all of the actors in the cluster that includes primary actor 1812 as well as a portion of the actors in the cluster containing primary actor 1806 and a portion of the actors in the cluster containing primary actor 1843. If messages corresponding to user requests are being evenly distributed to primary actors 1806 and 1812 by the controller associated with REST endpoint 1804, the RAD^2-application node corresponding to curve 1842 is shouldering a greater portion of the cumulative workload than the RAD^2-application node corresponding to curve 1840.

FIG. 18C illustrates the values for one type of metric that is easily collected from a RAD^2 application. The number of messages passed in each direction between endpoints and actors and between pairs of actors can be collected from the message-passing layer with relative ease and without introducing extensive code modifications or incurring significant computational overheads. Thus, during the periods between workload-balancing operations, a RAD^2 application can monitor application activities by collecting indications of the number of messages passed in each direction between actors and REST endpoints which exchange messages through the message-passing layer. The currently disclosed workload-balancing operation uses these collected numbers of passed messages to estimate portions of the cumulative workload handled by each of the RAD^2-application nodes.

Figure 19A:
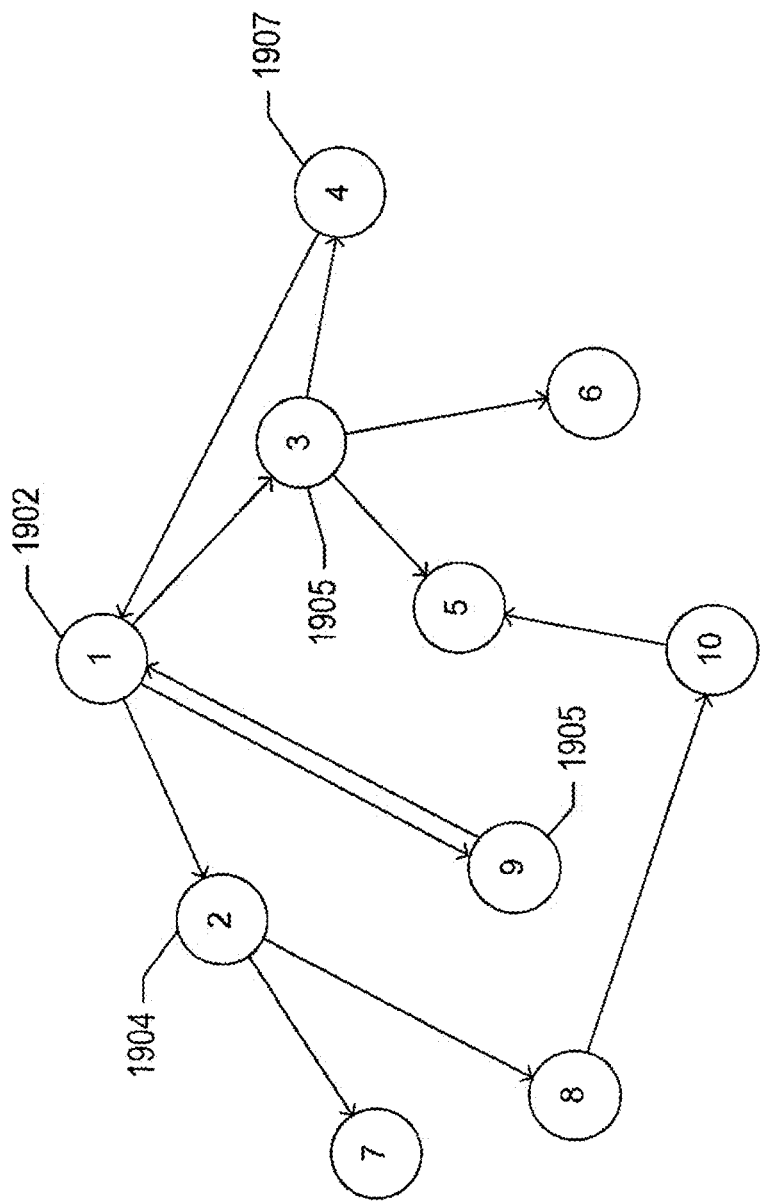
FIGS. 19A-E illustrate a page-rank algorithm used to rank webpages based on the number of hyperlinks directed from the webpages to other webpages.
Figure 19B:
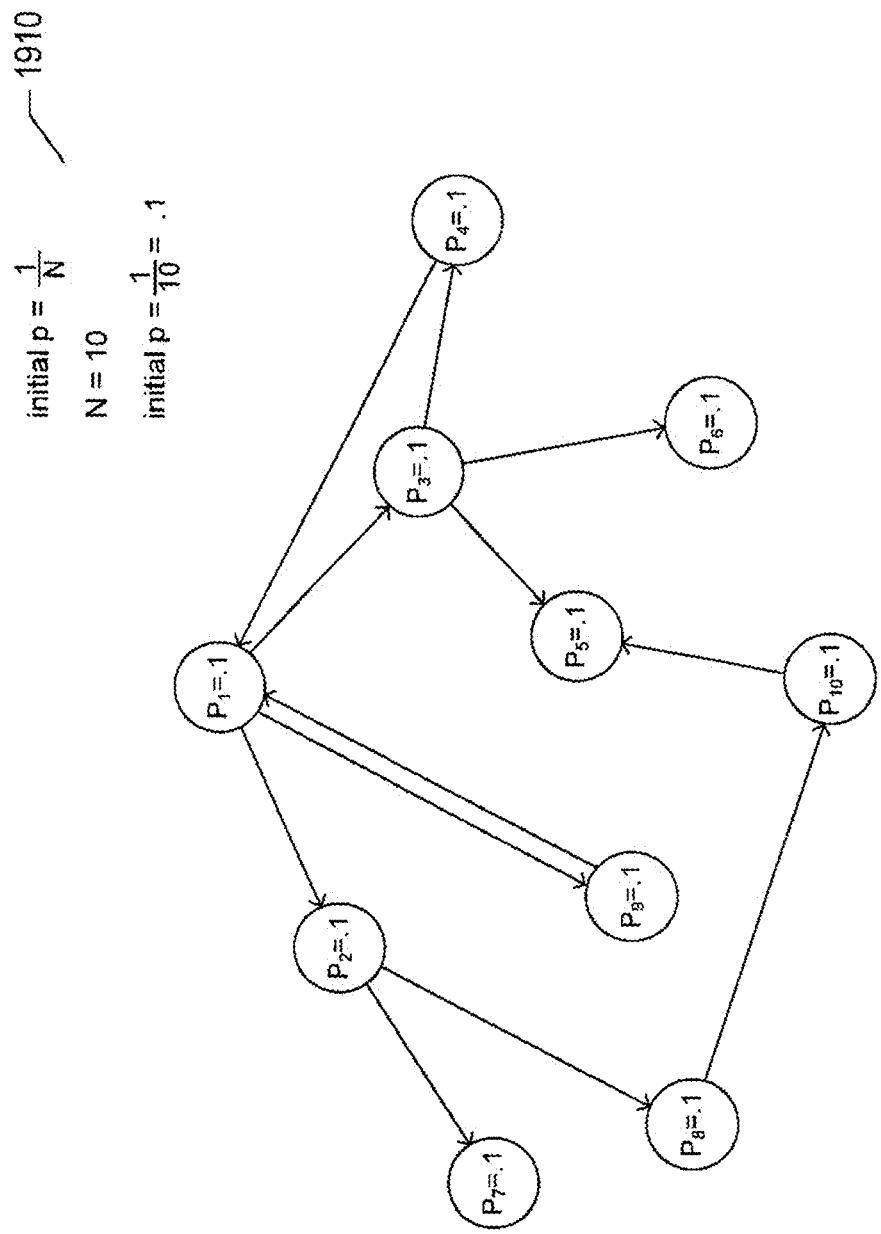

FIGS. 19A-E illustrate a page-rank algorithm used to rank webpages based on the number of hyperlinks directed from the webpages to other webpages. FIG. 19A shows a small number of webpages, each represented by a circle, and the links between them, each represented by an arrow. Webpage 1902 contains hyperlinks to webpages 1904-1906 and webpages 1905 and 1907 contain hyperlinks to webpage 1902. The page-rank algorithm involves initially assigning a probability to each webpage, as shown in FIG. 19B. The initial probability is the reciprocal of the number of webpages considered, N, as indicated by expression 1910. Thus, as indicated in FIG. 19B by initial probabilities inscribed in each circle, each webpage initially receives a probability of 0.1. These probabilities are then iteratively adjusted in successive transfer cycles until the probability values converge to stable values.

Figure 19C:
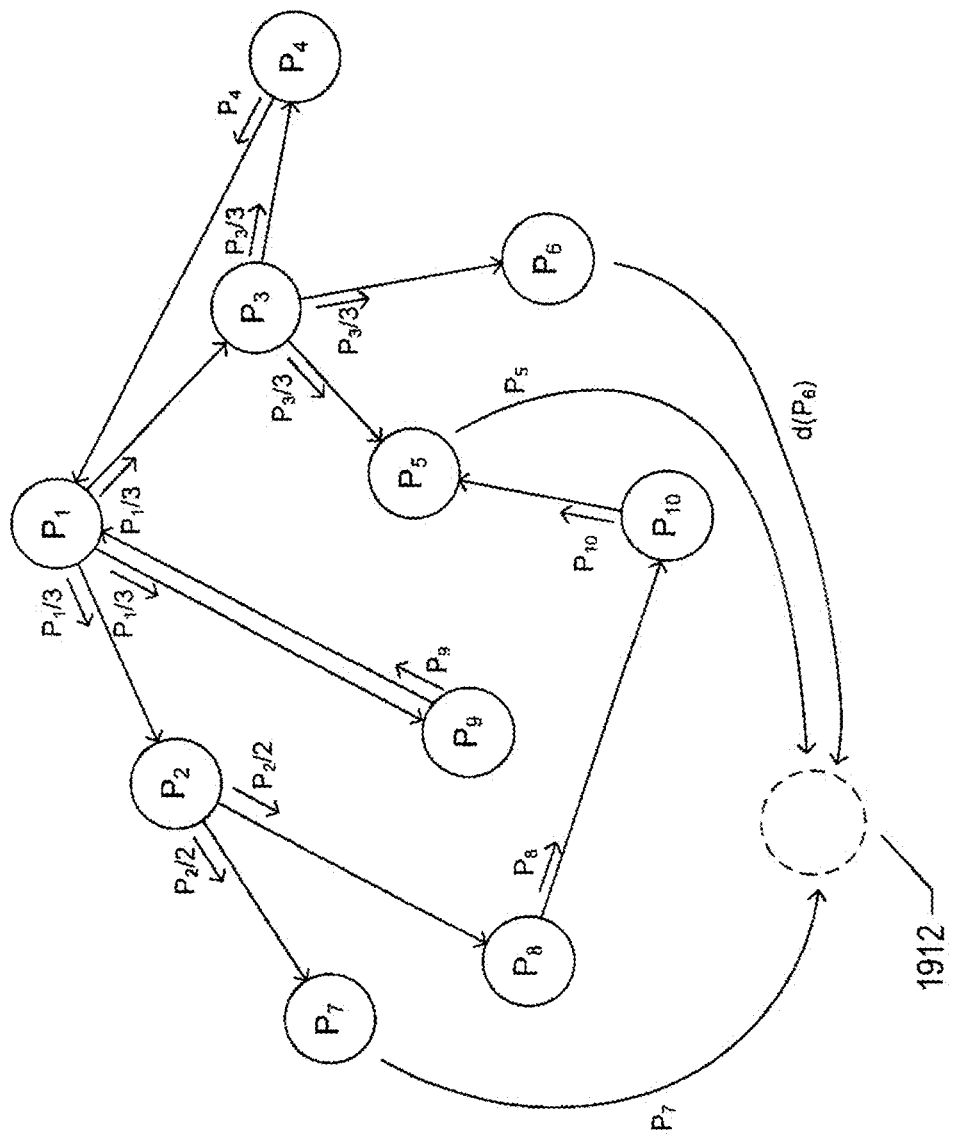
Figure 19D:
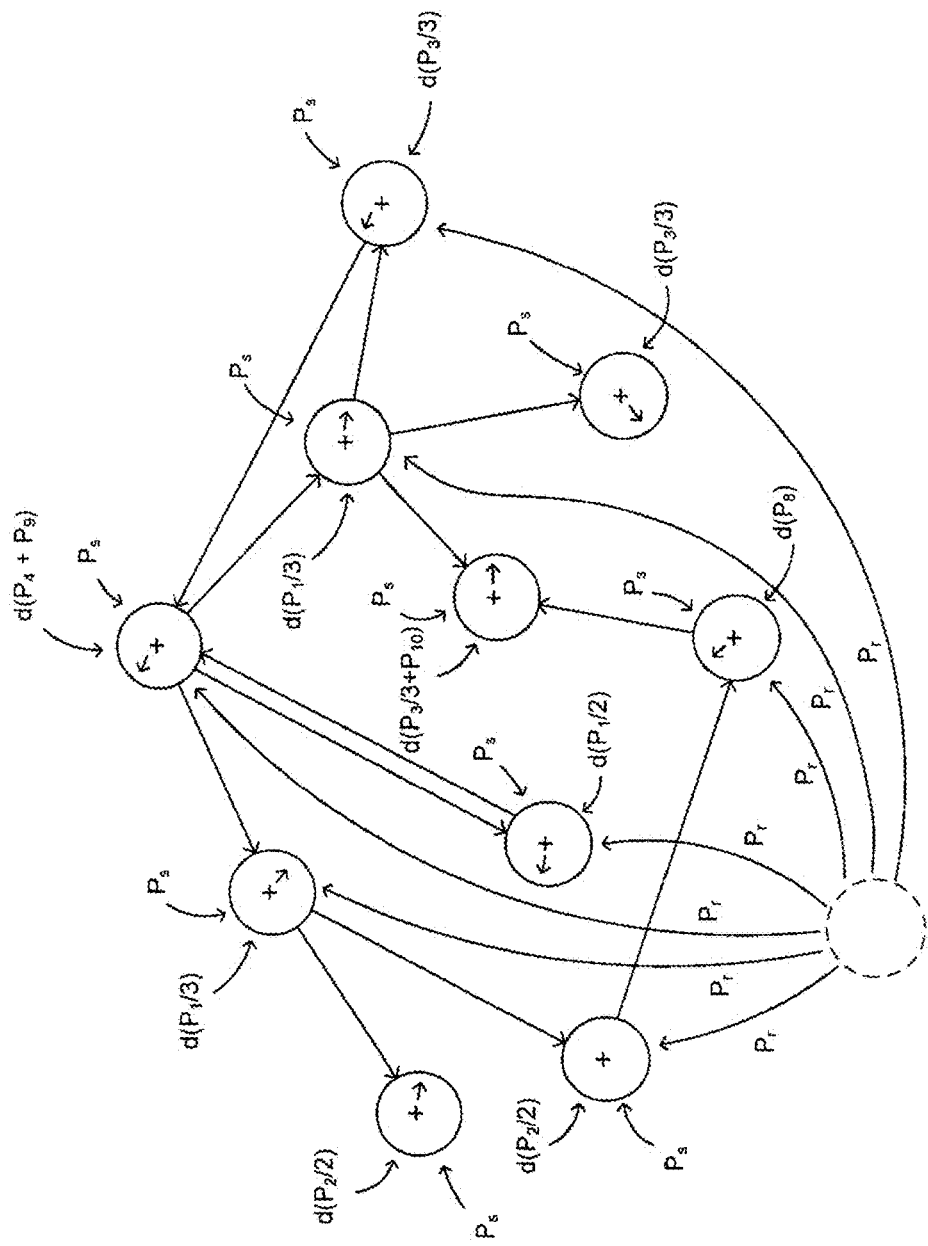
Figure 19E:
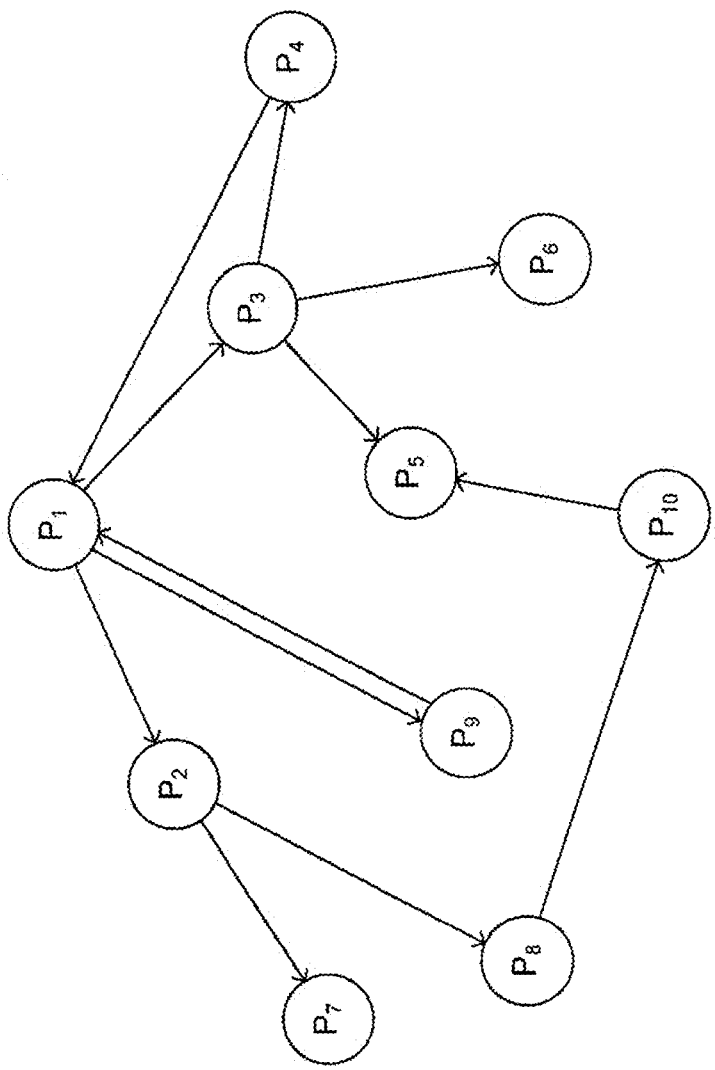

During each transfer cycle, each webpage transfers a portion of its probability either to those webpages for which it contains hyperlinks or, in the case of a sink webpage, which contains no hyperlinks to other webpages, to all of the non-sink webpages. Thus, in the first part of each cycle, as illustrated in FIG. 19C, the probability associated with a webpage is divided by the number of outgoing hyperlinks from the webpage and this value is output by the webpage to each webpage connected to the webpage by an outgoing link. In the case of sink nodes, which lack outgoing hyperlinks, the current probabilities associated with the sink nodes can be thought of as being transferred to a virtual node 1912, which then evenly distributes the probabilities it receives to the non-sink webpage nodes. Then, in the second portion of each cycle, as illustrated in FIG. 19D, each node collects the probability portions transferred to it by other nodes, sums these probability portions, multiplies the sum by a factor d in the range [0.0<d<1.0], adds the ratio (1−d)/N to the sum, and sets its current probability to the sum.

The iteration of probability-transfer cycles continues until the cumulative change in the probability distribution represented by the probabilities associated with the nodes falls below a threshold value. In many cases, the cumulative change in the probability distribution is computed as the square root of the sum of the squares of the differences between the probabilities associated with each node in the two most recent cycles. The probabilities associated with each webpage following termination of the probability-transfer-cycle iterations sum to 1.0, as is the case with normalized probability distributions. The probability associated with a node, or webpage, indicates the probability that a viewer who begins surfing the webpages at a randomly selected webpage will end up viewing the page.

The currently disclosed RAD^2-application architecture uses a workload-estimation method that is similar to the above-discussed page-rank method to estimate the percentages of a total workload applied to a RAD^2 application handled by each actor during a monitoring period. These percentages can be added for each actor cluster to determine the percentages of the total workload handled by each cluster. The clusters can then be assigned to RAD^2-application nodes based on workload-percentages in order to distribute, in a balanced fashion, the total workload among the RAD^2-application nodes. There are a variety of different possible implementations of the modifications to the workload-estimation method based on modifications to the page-rank method.

FIGS. 20A-C and 21A-F show a simple C++ implementation of the workload-estimation method for determining the percentages of a total workload handled by each actor, as in the example discussed above with reference to FIGS. 18A-C. FIGS. 20A-C provide constants and class declarations for the implementation, as generally provided in a header file. FIGS. 20A-C and 21A-F provide implementations of most of the class member functions.

The workload-estimation method associates each actor node of a graph with a value p, as in the page-rank method. In the workload-estimation method, this value can be thought of as the fraction of a total number of messages current associated with the actor. The messages are transferred from node to node, in successive message-transfer cycles, just as probabilities are transferred in the page-rank method. Message transfer cycles continue to be carried out until the message fractions stabilize, just as in the page-rank method. In fact, certain implementations of the workload-estimation method are obtained by making only small adjustments to the page-rank method. However, in the described implementation, additional modifications are made to provide more adjustable parameters to tailor the method to particular RAD^2 applications. One modification is to associate each actor node with a workload fraction work in addition to the message fraction p. The workload fraction is based on the amount of message passing carried out by the node during the transfer cycles, but different types of message passing are differently weighted in order to better estimate workload rather than message passing, alone. This also allows messages to be passed in only one direction, from REST endpoints to primary actors and then down through actor clusters to sink-node actors and then back to REST endpoints, while crediting actors for processing return messages that flow in the opposite direction. It also allows the workload fractions to be associated only with actors, rather than also being associated with REST endpoints. When the message fractions stabilize, the workload fractions associated with the actor nodes provide an estimate of the percentage of the total workload handled by the actor nodes.

At the top of FIG. 20A, six constants are declared. The constant MAX_TO_NODES 2002 is the maximum number of actors, which are nodes in the actor graph, to which a particular actor can send messages. The constants damp and oneMinusDamp 2003 are multiplies of the message fraction p that determine the portion of p transferred in the current cycle and the portion of p retained by an actor node. The constant SINK_COEFFICIENT 2004 is a parameter used to increase the workload fraction for sink nodes of the graph. The constant THRESHOLD 2005 is the value below which the cumulative change in message percentages must fall in order to consider the current percentages as converged.

The alias NodePtr 2006 is a type for a pointer to a node and the alias EdgePtr 2007 is a type for a pointer to an edge. Instances of the class edge 2008 represent graph edges, which indicate message passing between two nodes, as discussed above with reference to FIG. 18A. An edge instance includes: (1) member data indicating the two nodes connected by the edge 2010; (2) member data indicating the number of messages passed in each direction through the edge 2011; and (3) Boolean data members 2012 that indicate whether a direction of an edge corresponds to response messages that respond to received incoming messages or whether the direction corresponds to messages representing requests for processing. Response messages propagate from lower-level nodes in a cluster upward to the primary node and request messages propagate from REST endpoints downward to the primary node and lower-level nodes in a cluster. A set of public function members 2013 include a constructor, an initiator function for initiating the values of the various data members of the edge class, and various in-line functions for returning the value of the data members the edge class.

The structure internalNode 2014 represents a node to which messages are passed by another node. The structure member node 2015 is a pointer to the node to which messages are passed. The structure member f 2016 is the fraction of the current probability associated with a transferring node that is transferred to the node represented by an instance of the internalNode structure when request messages are distributed during each cycle. The member fComb 2017 is the fraction of the work transferred to the node represented by an instance of the internalNode structure during each cycle. The structure member returnMsg 2018 indicates whether the node represented by an instance of the internalNode structure receives response messages or request messages.

FIG. 20B shows a class declaration for the class node 2020. Instances of the class node represent graph nodes, or actors. Each instance of the class node includes numerous private data members 2021. The data members p and work 2022 store the percentage of messages and the percentage of the cumulative work, respectively, associated with the node. The array toNodes 2023 includes an internalNode structure for each node to which the node represented by an instance of the class node sends messages. The number of such nodes is stored in the data member numToNodes 2024. The data member numOut 2025 indicates the number of nodes to which the node represented by an instance of the class node sends both portions of the percentage of messages and portions of percentage of work during each transfer cycle while the data member numOnly indicates the number of nodes to which the node represented by an instance of the class node sends only work portions. A set of data members 2027 stores the outgoing and incoming message portions, incoming work portions, and remaining message portions for the node during each cycle. The data members 2028 are used to maintain a running average of the work portions received by the node. The member functions for the class node include a constructor 2029 and a number of member functions 2034 for setting and retrieving values of data members.

The function member addToNode 2031 of the class node is used to add a target node to the array toNodes 2023. The member function distributions 2032 is used to determine the fractions of message and work percentages to be distributed to the nodes represented by the internalNode structure instances in the array toNodes. The member function next 2033 is called to carry out the first part of each transfer cycle and the member function nextFinish 2034 is called to carry out the final portion of each transfer cycle. A node receives message portions and work portions via the member functions receiveMsgs and receiveWork 2035.

Finally, FIG. 20C provides a declaration for the class graph 2040 which represents an entire graph, such as that shown in FIG. 18A. An instance of the class graph includes a pointer to the set of nodes in the graph 2041, and an indication of the number of nodes in the graph 2042, a pointer to the edges in the graph 2043, an indication of the number of edges in the graph 2044, a pointer to the REST endpoints in the graph 2045, an indication of the number of REST endpoint s in the graph 2046, a pointer to the fractions of the total number of messages emitted by each REST endpoint 2047 during each transfer cycle, and a print function 2048 that displays the current work percentages for each node, or actor, in the graph. The class graph includes a constructor 2049 and destructor 2050. In addition, the class graph includes a member function add Edge 2051 which adds an edge to the graph, a member function initiate 2052 which initiates the nodes of the graph in preparation for iterating through the transfer cycles in order to determine the percentages of the total cumulative work carried out by each node, and a member function run 2053 which carries out iterative transfer cycles until the message percentages converge.

FIGS. 21A-F provide the implementations of the various member functions of the class node in the class graph. The constructor for the class node 2102 initializes the various data members. The member function addToNode 2103 adds a target node to the array toNodes. Initially, the internalNode data members f and fComb are set to actual numbers of messages collected during a monitoring interval, as discussed above with reference to FIG. 18C. These numbers are then divided by the total number of messages in order to generate fractional percentages for transfer to the node during each cycle. The member function distributions 2104, shown in FIG. 21B, converts the number of messages to fractional distributions, as discussed above. FIG. 21C provides an implementation of the member function next of the class node. If an instance of the class node represents a REST endpoint, as indicated by the member ePoint, the node distributes its entire percentage of messages during the transfer cycle in statements 2106. The percentage of messages currently associated with the REST entry point is computed as a fraction stored in member p times the number of messages in the virtual sink node passed to the function in the argument left. Otherwise, when the node represents a non-sink-node actor, the node retains a portion of its message percentage, indicated by the data member remaining 2108, and transfers the remaining portion of its message percentage, indicated by data member outgoing 2109. However, when the node is a sink node, the node does not retain a message percentage 2110 and forwards all of its message percentage to the virtual sink node 2111. The outgoing message percentages are transmitted in the for-loop 2112 in the case of nodes that pass messages to other nodes while the percentage of messages is transmitted to the virtual sink node on lines 2113. Finally, on lines 2114, work portions are transmitted to all nodes that either receive request messages or that receive response messages. The member function nextFinish 2116, shown at the top of FIG. 21D, is called to complete a transfer cycle. The squared difference of the message percentages for the current cycle and preceding cycle are computed and returned in order to detect when the message percentages have converged, on lines 2117. The new message percentage, newP, is computed as the sum of the remaining message percentage and the incoming message percentage. The running average of the workload percentage associated with the node is updated on lines 2118. The various data members used to accumulate messages and work during the first portion of the cycle are reset to 0, on lines 2119. On line 2120, the message percentage p is updated. The node class member functions next and nextFinish represent the bulk of the workload-estimation method in the described implementation.

The constructor for the class graph 2122 allocates data structures for nodes, edges, REST endpoints, and REST-endpoint distribution fractions. The destructor for the class graph 2123 deallocates the data structures for the nodes, edges, REST endpoints, and REST-endpoint distribution fractions. The member function addEdge for the class graph 2124 is called to add an edge to the graph. When one of the nodes connected by the edge is a REST endpoint, the number of messages sent by the REST endpoint are stored in the element of the array endPointMsgs to compute distribution fractions for the REST endpoint on lines 2125 and 2126. For node-to-node edges, internalNode elements are added to the toNode arrays of the connected nodes 2128. The member function initiate 2130 for the class graph initiates all of the nodes in the graph in the for-loop 2132, computes the distribution fractions for the REST endpoints in for-loop 2134, and initiates the REST-endpoint nodes in the for-loop 2136. Finally, the member function run for the class graph 2140 carries out a series of transfer cycles until the cumulative difference in message percentages between successive transfer cycles falls below a threshold value. The first part of each transfer cycle is carried out in for-loops 2142 and the second part of each transfer cycle is carried out in for-loops 2144. The do-while-loop 2146 terminates when the cumulative differences fall below the threshold value 2147. An example main routine 2148 illustrates an example computation of the workload distributions for the actors in a graph, such as the graph shown in FIG. 18A. An instance of the class graph is instantiated, on line 2149. A series of calls to the member function addEdge 2150 add the edges of the graph to the graph instance. Ellipsis 2151 indicates that additional edges are added for the example graph shown in FIG. 18C. A call to the member function initiate preparers the graph for workload-distribution calculation on line 2152. Finally, the member function run is called, on line 2153, to carry out a series of transfer cycles until the message percentages converge.

FIG. 22 illustrates the workload-distribution results generated by applying the workload-distribution calculation shown in the C++ implementation discussed above with reference to FIGS. 20A-21F to the graph shown in FIG. 18C. The percentages of the total workload handled by the actors is shown in data block 2204 and the percentages of the total work carried out by the five actor clusters are shown on line 2206. Actor cluster 1 is the cluster associated with primary actor 1806. This cluster is responsible her handling close to 19% 2208 of the total workload during the monitoring interval. The large cluster that includes primary actors 1831 and 1832 accounts for over 40% of workload 2210. A comparison of the workload percentages shown in FIG. 22 to the size of the actor clusters reveals that the workload percentages attributed to the clusters are somewhat related to the size of the clusters, but not necessarily fully proportional to the cluster sizes. Instead, the workload percentages are function of the total number of messages passed to and from between the actors of the cluster and between the REST endpoint that feeds messages to the cluster and the primary nodes of the cluster, parameter values, and the distribution fractions assigned to the REST endpoints. Many additional parameters and associated considerations may be incorporated into the workload-distribution method to better estimate the workload distribution.

Figure 23A:
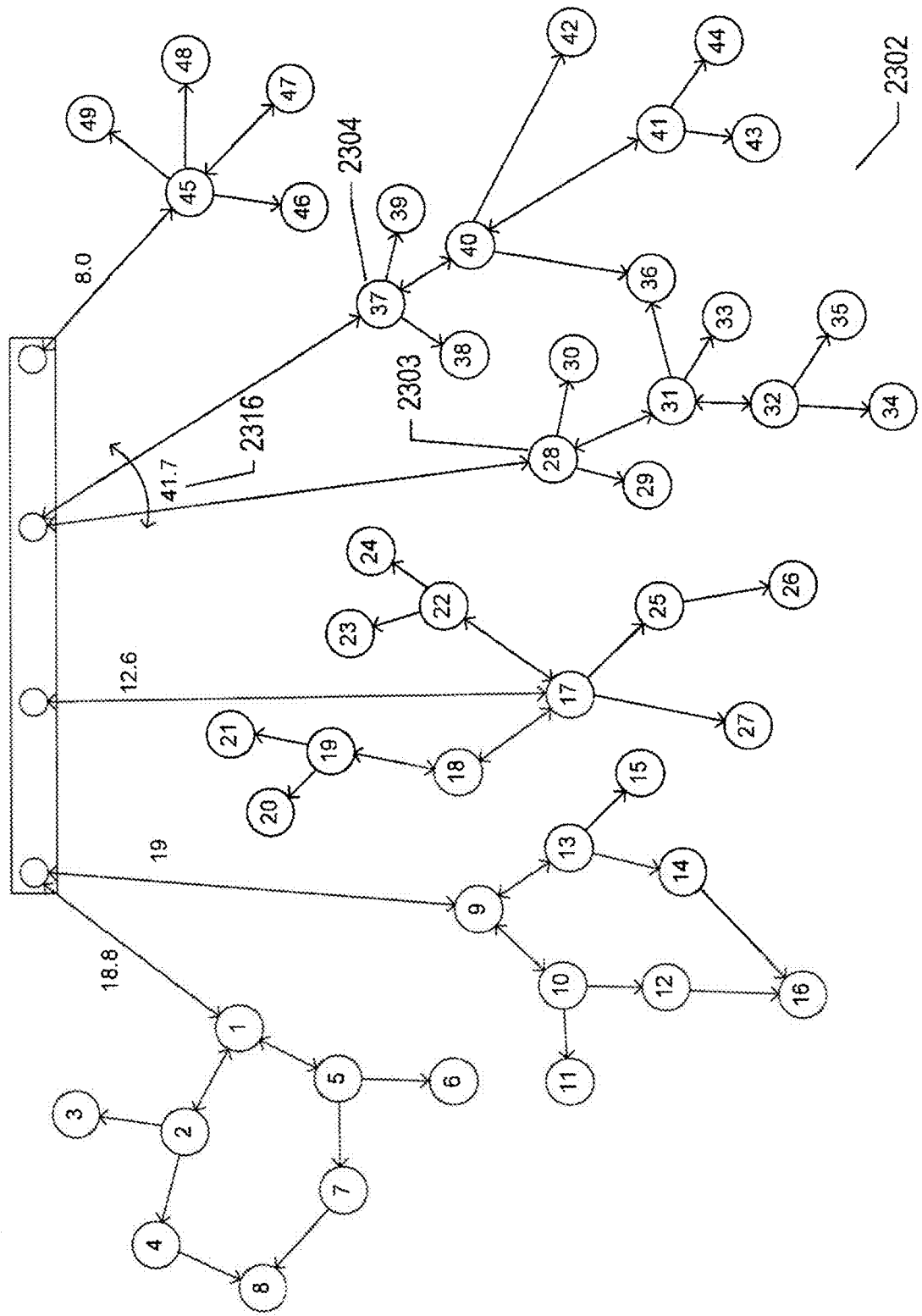
FIGS. 23A-C illustrate, using the example of FIGS. 18A-C, how the workload distribution computed by the method illustrated by the implementation provided in FIGS. 20A-21F and shown in FIG. 22 can be used to distribute the workload more evenly across RAD^2-application nodes.
Figure 23B:
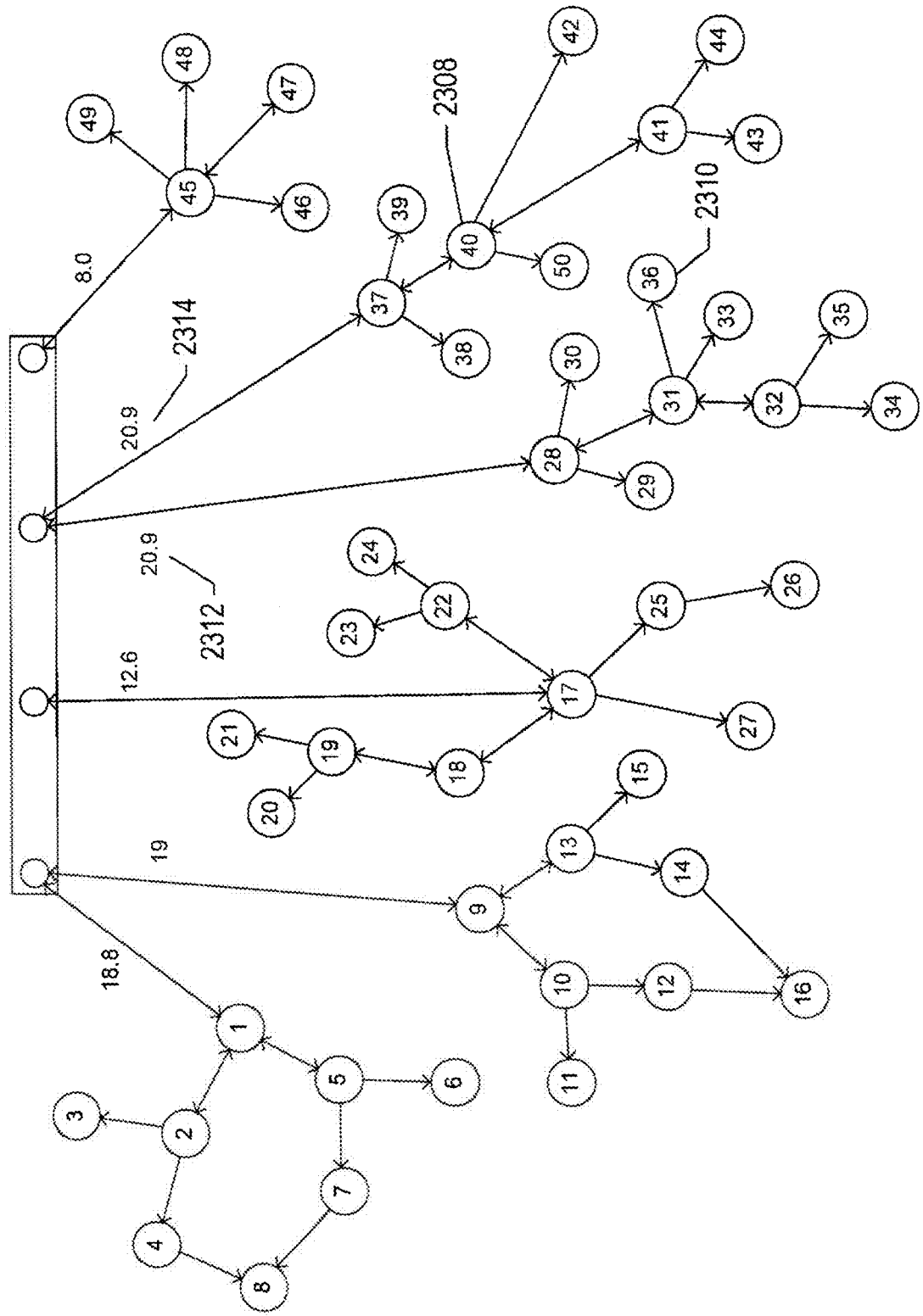
Figure 23C:
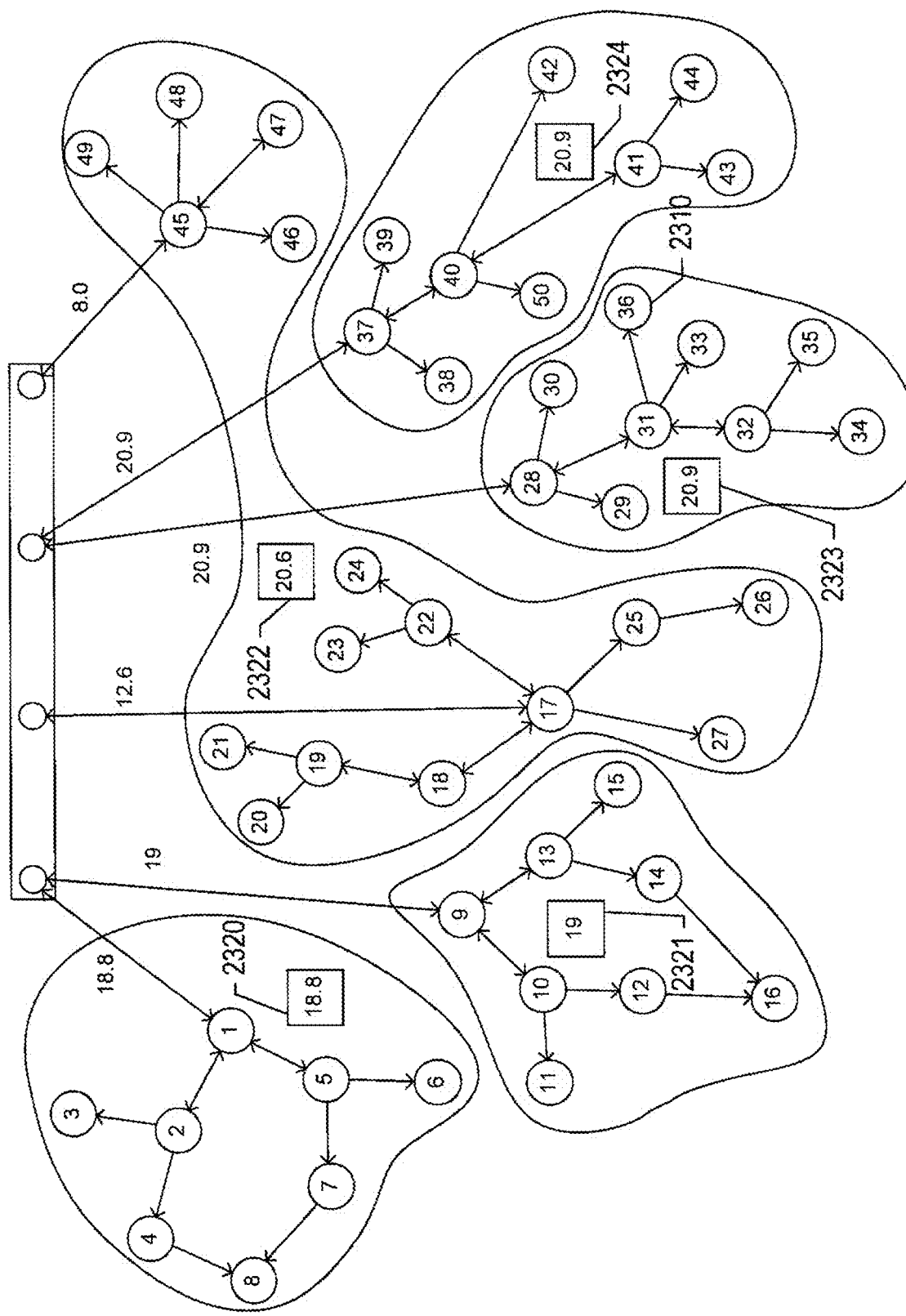

FIGS. 23A-C illustrate, using the example of FIGS. 18A-C, how the workload distribution computed by the above-discussed workload-distribution-estimation method can be used to distribute the workload more evenly across RAD^2-application nodes. FIG. 23A shows the graph of FIG. 18A with edges leading from REST endpoints to primary nodes annotated with the computed workload percentages for the clusters. The cluster 2302 containing primary nodes 2303 and 2304 processes more than twice the workload processed by any of the remaining clusters. To facilitate a more even distribution of clusters among the RAD^2-application nodes, this cluster is broken into two clusters, as shown in FIG. 23B, by adding a new node, or actor 2306, to receive messages from actor 2308 and removing the edge between actor 2308 and actor 2310. As discussed above, it is quite simple to add actors to a RAD^2 application, and this feature of RAD^2 applications is exploited, in this example, to break up a large cluster into two smaller clusters. The work percentages for the two clusters 2312 and 2314 are estimated to be half of the computed workload distribution for the large cluster 2316 in FIG. 23A. Then, as shown in FIG. 23C, the enclosed curves can be redrawn to include the clusters in RAD^2-application nodes such a way that the workload percentages assigned to each RAD^2-application node are reasonably equivalent. The workload percentages for each RAD^2-application node are shown in squares 2320-2324. By distributing actor clusters among RAD^2-application nodes rather than individual actors, the actors that cooperate closely to process particular types of REST requests are collocated within a single RAD^2-application node, which minimizes inter-RAD^2-application-node message traffic and which may also minimize network transfers of data-transfer objects.

Figure 24A:
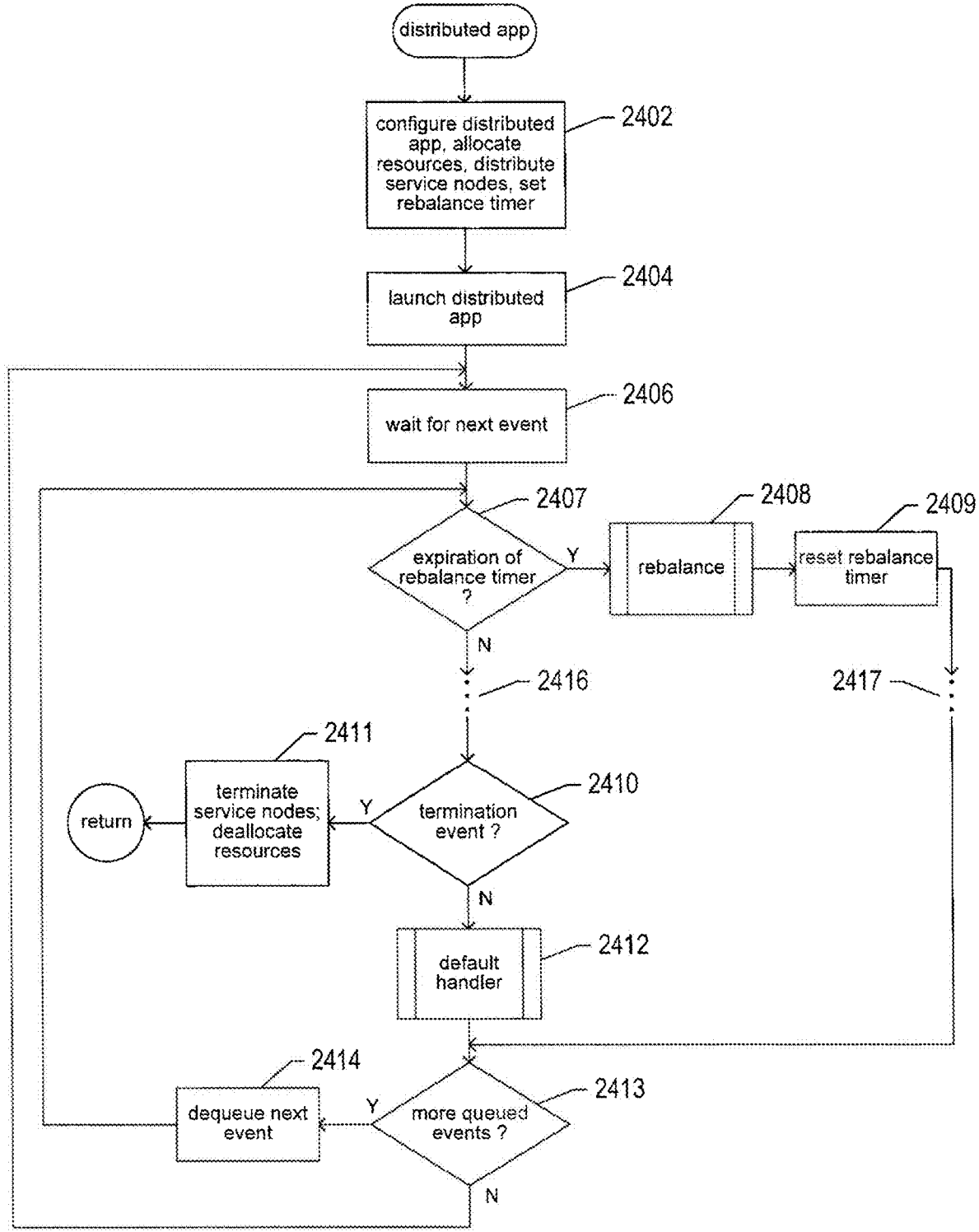
FIGS. 24A-B provide control-flow diagrams that illustrate fine-grained workload-balancing within a RAD^2 application.
Figure 24B:
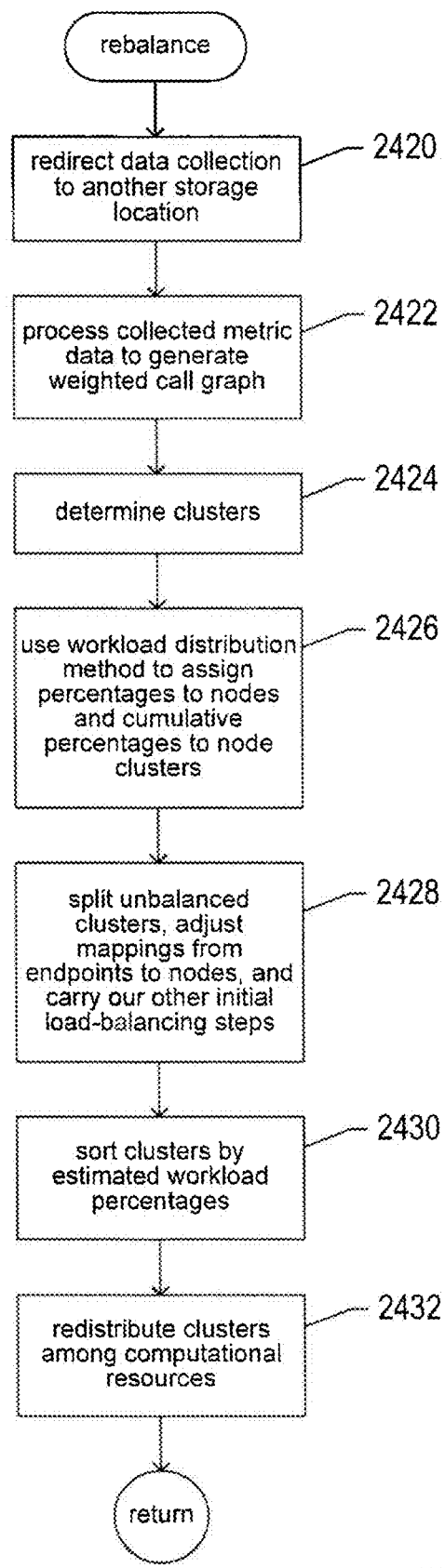

FIGS. 24A-B provide control-flow diagrams that illustrate fine-grained workload-balancing within a RAD^2 application. FIG. 24A provides a control-flow diagram for the routine "distributed app," which represents monitoring of a RAD^2 application over the lifetime of the RAD^2 application. In step 2402, the RAD^2 application is configured, resources are allocated for the RAD^2-application nodes, and a rebalance timer is set. In step 2404, the RAD^2 application is launched. Steps 2406-2414 represent an event loop that continues until the RAD^2 application terminates. In step 2406, the monitor waits for a next event to occur. When the next event is an expiration of the rebalance timer, as determined in step 2407, a routine "rebalance" is called, in step 2408, to rebalance the workloads handled by the RAD^2-application nodes. In step 2409, the rebalance timer is reset. Ellipses 2416-2417 indicate that many other types of events are handled during the lifecycle of a RAD^2 application. When a termination event is detected, as determined in step 2410, the RAD^2-application nodes are terminated and allocated resources are deallocated, in step 2411, prior to termination of the RAD^2 application. A default handler 2412 handles any rare or unexpected events. When there are more events that have been queued during processing of the most recently handled event, as determined in step 2413, a next event is dequeued, in step 2414, and control returns to step 2407 to process the next event. Otherwise, control returns to step 2406, where the monitor waits for a next event to occur. The rebalance timer is used to partition of the lifecycle into monitoring periods, at the end of each of which workload-balancing is carried out.

FIG. 24B provides a control-flow diagram for the routine "rebalance," called in step 2408 of FIG. 24A. In Step 2420, collection of message-passing data is redirected to another storage location for continued metric-data collection while the collected messages in the current storage location are processed for determining the workload distribution for the actors. In step 2422, the collected messages are processed to generate a weighted call graph, such as the example weighted call graph shown in FIG. 18C. In Step 2424, any of many different possible clustering methods can be applied to the nodes of the graph in order to determine the actor clusters within the graph. In step 2426, the workload-distribution-computation method is applied to the graph in order to generate workload percentages for the actors and actor clusters, as discussed above with reference to FIG. 22. In step 2428, unbalanced clusters may be split into smaller clusters to generate a set of clusters with relatively uniform workload percentages, as discussed above with reference to FIG. 23C. Other types of workload-balancing steps may also be taken, including readjusting controller-level workload-balancing, mentioned above. In step 2430, the set of actor clusters is sorted by estimated workload percentages and then, in step 2432, the actor clusters are redistributed among the RAD^2-application nodes, as discussed above with reference to FIG. 23C. In general, there may be many thousands, hundreds of thousands, or millions of actors and large numbers of clusters. Thus, each RAD^2-application node may receive many different clusters during the redistribution. Various different redistribution schemes can be used. In one scheme, a round-robin approach is used to distribute the clusters in descending sorted order. In another approach, the workload percentages associated with clusters are matched to the available computational resources in the RAD^2-application nodes, so that each cluster is placed into a RAD^2-application node with available computational resources that can best handle that clusters workload percentage.

FIGS. 24A-B show only actor workload-balancing operations periodically carried out for fine-grained balancing of actors across the available RAD^2-application nodes. Rebalancing may also occur following adding or deleting RAD^2-application nodes from the RAD^2 application during scaling operations periodically carried out to match the total workload to the total volume of computational resources currently available.

The present invention has been described in terms of particular embodiments, it is not intended that the invention be limited to these embodiments. Modifications within the spirit of the invention will be apparent to those skilled in the art. For example, any of many different implementations of the RAD^2-application rebalancing operation and workload-distribution-computation system can be obtained by varying various design and implementation parameters, including modular organization, control structures, data structures, hardware, operating system, and virtualization layers, and other such design and implementation parameters. In alternative implementations, various different workload-distribution-computation methods based on the page-ranked method can be obtained by including additional parameters that can be adjusted to produce estimated workload distributions that faithfully mirror workload distributions that might be obtained by far more complex and invasive monitoring methods. Actor redistribution can be carried out periodically or, in alternative implementations, when monitoring routines detect workload imbalances using additional types of metrics.

The invention claimed is:

1. An improved distributed service-oriented application that operates within a distributed computer system having multiple computer systems, communications networks, and data-storage devices and providing computational environments, the distributed service-oriented application comprising:
multiple application nodes, each implemented in one of the computational environments provided by the distributed computer system and each comprising
a stateless-communications layer that provides a connection between the application node and external users of the distributed service-oriented application through which the stateless-communications layer receives requests from the external users,
an actors layer that provides an execution environment for multiple actors and a message-passing connection between each actor and the stateless-communications layer as well as between each actor and actors executing in external application nodes, and
a data-grid layer that provides persistent data storage to each actor; and
a workload-balancing monitor that employs actor-cluster identification and actor-cluster redistribution, the monitor being configured to provide monitoring metric data for each of successive monitoring periods.

2. The improved distributed service-oriented application of claim 1 wherein each computational environment is one of:
a discrete computer system;
an aggregation of two or more discrete computer systems;
a virtual machine;
an aggregation of one or more virtual machines;
a container;
an aggregation of one or more containers; and
a computational environment provided by a virtual machine or container.

3. The improved distributed service-oriented application of claim 1 wherein each actor within each application node of the distributed service-oriented application has a virtual actor address that is unique among the actors executing within the multiple application nodes.

4. The improved distributed service-oriented application of claim 3 wherein each message has a type and wherein each actor provides an indication of the types of messages that the actor is able to receive and process.

5. The improved distributed service-oriented application of claim 4 wherein, when the stateless-communications layer of an application node receives a request from an external user, the stateless communications layer:
associates the request with a stateless-protocol endpoint;
determines whether the request can be handled locally within the application node or whether to forward the request to an external application node;
when request is determined to be handled locally, passes a corresponding message to an actor executing within the actors layer of the application node; and
when the request is determined to be forwarded to an external application node, forwards the request to the stateless-communications layer of the external application node.

6. The improved distributed service-oriented application of claim 5 wherein, in determining whether the request can be handled locally within the application node, the stateless-communications layer identifies whether an actor executing in the actor layer of the application node has indicated that the actor can receive and process a message of a type corresponding to the type of request and/or stateless-protocol endpoint associated with the request.

7. The improved distributed service-oriented application of claim 4 wherein each actor has a mailbox from which the actor receives messages and to which the actor posts messages for transmission to the stateless-communications layer of the application node in which the actor executes and to other actors executing in the application node in which the actor executes or in other application nodes of the distributed service-oriented application.

8. The improved distributed service-oriented application of claim 7 wherein each actor receives and processes one message at a time.

9. The improved distributed service-oriented application of claim 8 wherein an actor processes a received message by:
selecting a behavior corresponding to the type of the received message; and
executing the selected behavior.

10. The improved distributed service-oriented application of claim 9 wherein, during execution of a behavior, an actor may post messages, create one or more new actors, and retrieve data from the data-grid layer of the application node.

11. The improved distributed service-oriented application of claim 4 wherein the workload-balancing monitor collects message-passing metrics from the distributed service-oriented application for each of successive monitoring periods and uses the collected message-passing metrics, at the end of each monitoring period, to rebalance workload across the application nodes.

12. The improved distributed service-oriented application of claim 11 wherein the workload-balancing monitor rebalances workload by one or more of:
readjusting policies that control message transmission by stateless-communications layers of the application nodes in response to received external-user requests;
increasing or decreasing the number of application nodes; and
redistributing actors across the application nodes.

13. The improved distributed service-oriented application of claim 12 wherein the workload-balancing monitor redistributes actors across the application nodes by:
generating a graph having actor nodes, stateless-protocol-endpoint nodes, and edges connecting pairs of nodes, each edge weighted by the numbers of messages passed between the nodes connected by the edge;
determining actor clusters within the graph;
applying a workload-distribution-estimation method to the graph to estimate portions, handled by each actor, of a total workload applied to the distributed service-oriented application during a monitoring interval;
determining an estimate of portions of the total workload handled by the actor clusters; and
redistributing the actor clusters across the application nodes so that the estimated workload portions handled by the actor clusters are distributed as evenly as possible across the application nodes.

14. The improved distributed service-oriented application of claim 13 further comprising:
dividing each of one or more actor clusters into two or more smaller actor clusters in order to even the estimated workload portions among the actor clusters prior to redistributing the actor clusters across the application nodes.

15. The improved distributed service-oriented application of claim 1 wherein each actor can access persistent data stored by the actor into a distribute data grid accessed through a data-grid layer of an application node from any of the application nodes of the distributed service-oriented application in which the actor is currently executing and wherein each actor can send messages to, and receive messages from, and other actor in the distributed service-oriented application from any of the application nodes of the distributed service-oriented application in which the actor is currently executing.

16. A method for optimizing an improved distributed service-oriented application that operates within a distributed computer system having multiple computer systems, communications networks, and data-storage devices and providing computational environments for multiple application nodes, each providing execution environments for multiple actors, the method comprising:
monitoring metric data for each of successive monitoring periods; and
at the end of each monitoring period, redistributing actors among the application nodes to even the estimated workload portions handled by each application node by using actor-cluster identification and actor-cluster redistribution.

17. The method of claim 16
wherein each application node is implemented in one of the computational environments provided by the distributed computer system; and
wherein each application node comprises
a stateless-communications layer that provides a connection between the application node and external users of the distributed service-oriented application through which the stateless-communications layer receives requests from the external users, associating a stateless-protocol endpoint with each request,
an actors layer that provides an execution environment for multiple actors and a message-passing connection between each actor and the stateless-communications layer as well as between each actor and actors executing in external application nodes, and
a data-grid layer that provides persistent data storage to each actor.

18. The method of claim 17 wherein actors are redistributed by:
generating a graph having actor nodes, stateless-protocol-endpoint nodes, and edges connecting pairs of nodes, each edge weighted by the numbers of messages passed between the nodes connected by the edge;
determining actor clusters within the graph;
applying a workload-distribution-estimation method to the graph to estimate portions, handled by each actor, of a total workload applied to the distributed service-oriented application during a monitoring interval;
determining an estimate of portions of the total workload handled by the actor clusters; and
redistributing the actor clusters across the application nodes so that the estimated workload portions handled by the actor clusters are distributed as evenly as possible across the application nodes.

19. The method of claim 17 wherein the actor clusters are redistributed across the application nodes by:
sorting the clusters in descending order based on their workload-portion estimates; and
distributing the actor clusters to application nodes by one of:
a round-robin approach in which the actors are distributed in order; and
successively locating each actor cluster, in order, to an application node with remaining resources that best match the actor cluster's estimated workload-portion estimate.

20. A physical data-storage device that stores computer instructions that, when executed by processors within a distributed computer system having multiple computer systems, communications networks, and data-storage devices and providing computational environments for multiple application nodes of a distributed service-oriented application, each providing execution environments for multiple actors of the distributed service-oriented application, control the distributed service-oriented application to:
monitor metric data for each of successive monitoring periods; and at the end of each monitoring period, redistribute actors among the application nodes to even the estimate workload portions handled by each application node by
generating a graph having actor nodes, stateless-protocol-endpoint nodes, and edges connecting pairs of nodes, each edge weighted by the numbers of messages passed between the nodes connected by the edge;
determining actor clusters within the graph;
applying a workload-distribution-estimation method to the graph to estimate portions, handled by each actor, of a total workload applied to the distributed service-oriented application during a monitoring interval;
determining an estimate of portions of the total workload handled by the actor clusters; and
redistributing the actor clusters across the application nodes so that the estimated workload portions handled by the actor clusters are distributed as evenly as possible across the application nodes by using actor-cluster identification and actor-cluster redistribution.

* * * * *